(12) United States Patent
Draper et al.

(10) Patent No.: US 7,779,268 B2
(45) Date of Patent: Aug. 17, 2010

(54) BIOMETRIC BASED USER AUTHENTICATION AND DATA ENCRYPTION

(75) Inventors: Stark C. Draper, Newton, MA (US);
Ashish Khisti, Cambridge, MA (US);
Emin Martinian, Arlington, MA (US);
Anthony Vetro, Arlington, MA (US);
Jonathan S. Yedidia, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 931 days.

(21) Appl. No.: 11/564,638

(22) Filed: Nov. 29, 2006

(65) Prior Publication Data

US 2007/0174633 A1 Jul. 26, 2007

Related U.S. Application Data

(63) Continuation-in-part of application No. 11/218,261, filed on Sep. 1, 2005, which is a continuation-in-part of application No. 11/006,308, filed on Dec. 7, 2004, now abandoned.

(51) Int. Cl.
*G06F 7/00* (2006.01)
*G06F 7/04* (2006.01)
*G06F 21/00* (2006.01)

(52) U.S. Cl. .................. 713/186; 726/6; 726/2; 726/26; 713/168; 713/182

(58) Field of Classification Search .................. 713/186, 713/168, 182; 704/270, 243; 726/6, 10, 726/26; 380/28–30
See application file for complete search history.

(56) References Cited

U.S. PATENT DOCUMENTS

| 3,611,290 | A | * | 10/1971 | Luisi et al. | 382/125 |
| 5,497,429 | A | * | 3/1996 | Shibuya | 382/125 |
| 5,815,418 | A | * | 9/1998 | Dolazza et al. | 702/86 |
| 7,223,686 | B2 | * | 5/2007 | Bae | 438/622 |
| 2002/0070844 | A1 | * | 6/2002 | Davida et al. | 340/5.53 |

OTHER PUBLICATIONS

Distributed source coding using serially-concatenated-accumulate codes, in Proc. ITW 2004, J. Chen, A. Khisti, D. M. Malioutov, and J. S. Yedidia.*

Rabiner 1989 L.R Rabiner, A tutorial on hidden Markov models and selected applications in speech recognition, Proc. IEEE 77 (1989).*

Kernighan, M., K. Church, and W. Gale. 1990. A spelling correction program based on a noisy channel model. In Proceedings.*

(Continued)

*Primary Examiner*—Kambiz Zand
*Assistant Examiner*—Imhotep Durham
(74) *Attorney, Agent, or Firm*—Dirk Brinkman; Gene Vinokur

(57) ABSTRACT

Biometric parameters acquired from human forces, voices, fingerprints, and irises are used for user authentication and access control. Because the biometric parameters are continuous and vary from one reading to the next, syndrome codes are applied to determine biometric syndrome vectors. The biometric syndrome vectors can be stored securely while tolerating an inherent variability of biometric data. The stored biometric syndrome vector is decoded during user authentication using biometric parameters acquired at that time. The syndrome codes can also be used to encrypt and decrypt data.

17 Claims, 21 Drawing Sheets

OTHER PUBLICATIONS

Information Theory. (2004). In Berkshire Encyclopedia of Human-Computer Interaction teaches source and channel coding.*

"Maximum A posteriori Decoding for Speech Codec Parameters," by W.N. Farrell and W.G. Cowley (1996).*

Yevgeniy Dodis, Leonid Reyzin, and Adam Smith. Fuzzy extractors: How to generate strong keys from biometrics and other noisy data. In Christian Cachin and Jan Camenisch, editors, Advances in Cryptology-EUROCRYPT 2004, vol. 3027 of Lecture Notes in Computer Science, pp. 79-100. Springer-Verlag, 2004.*

* cited by examiner

700

800

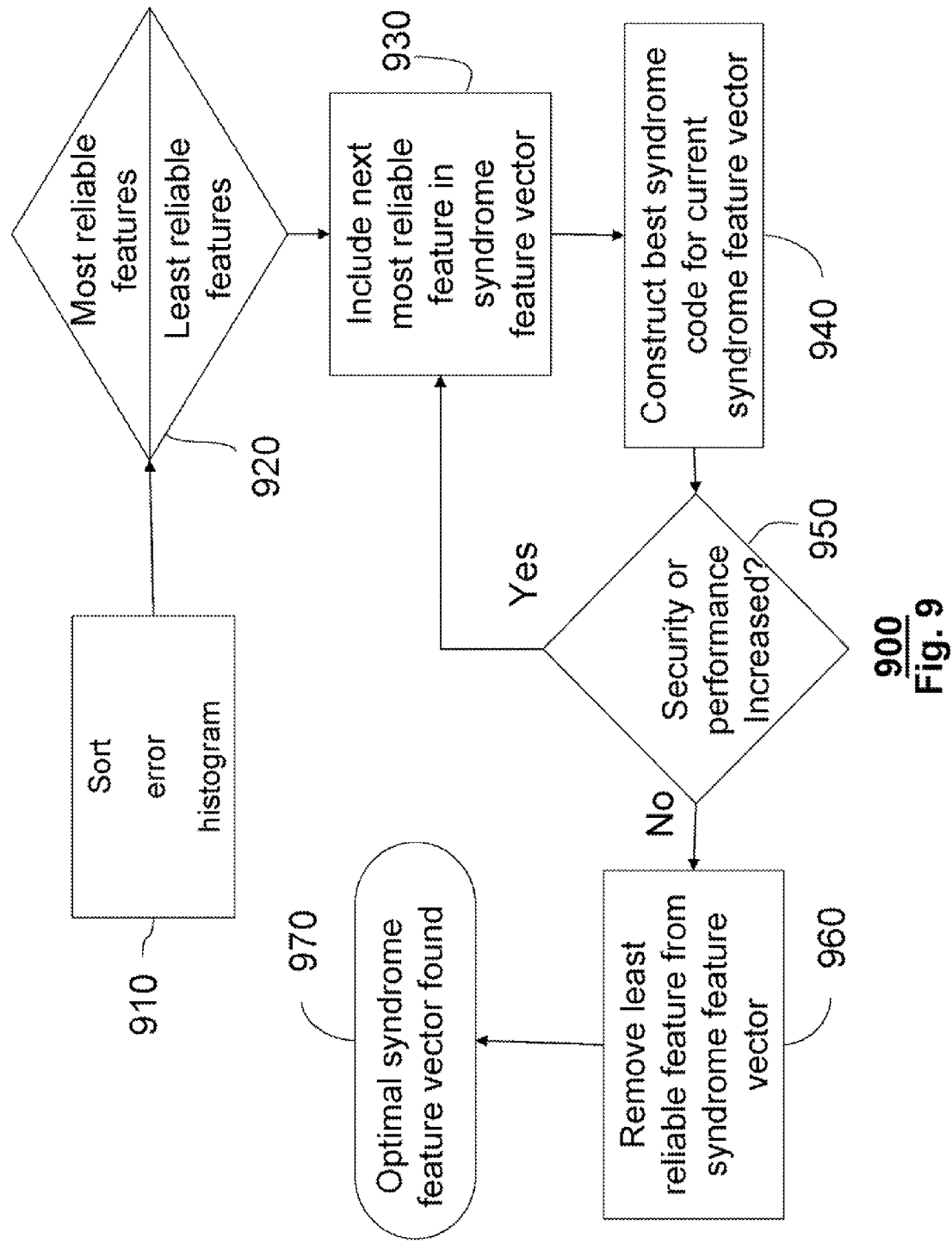

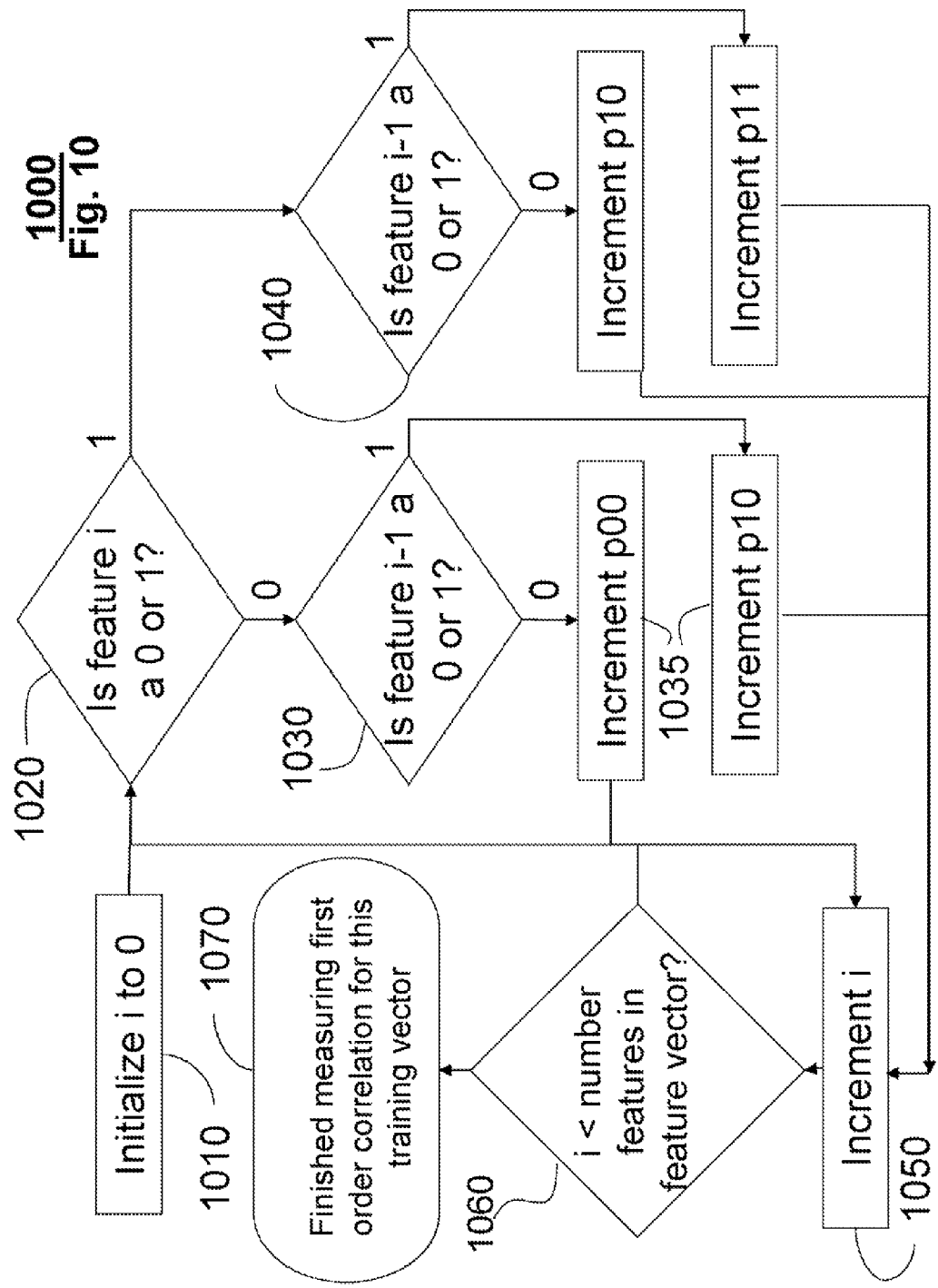

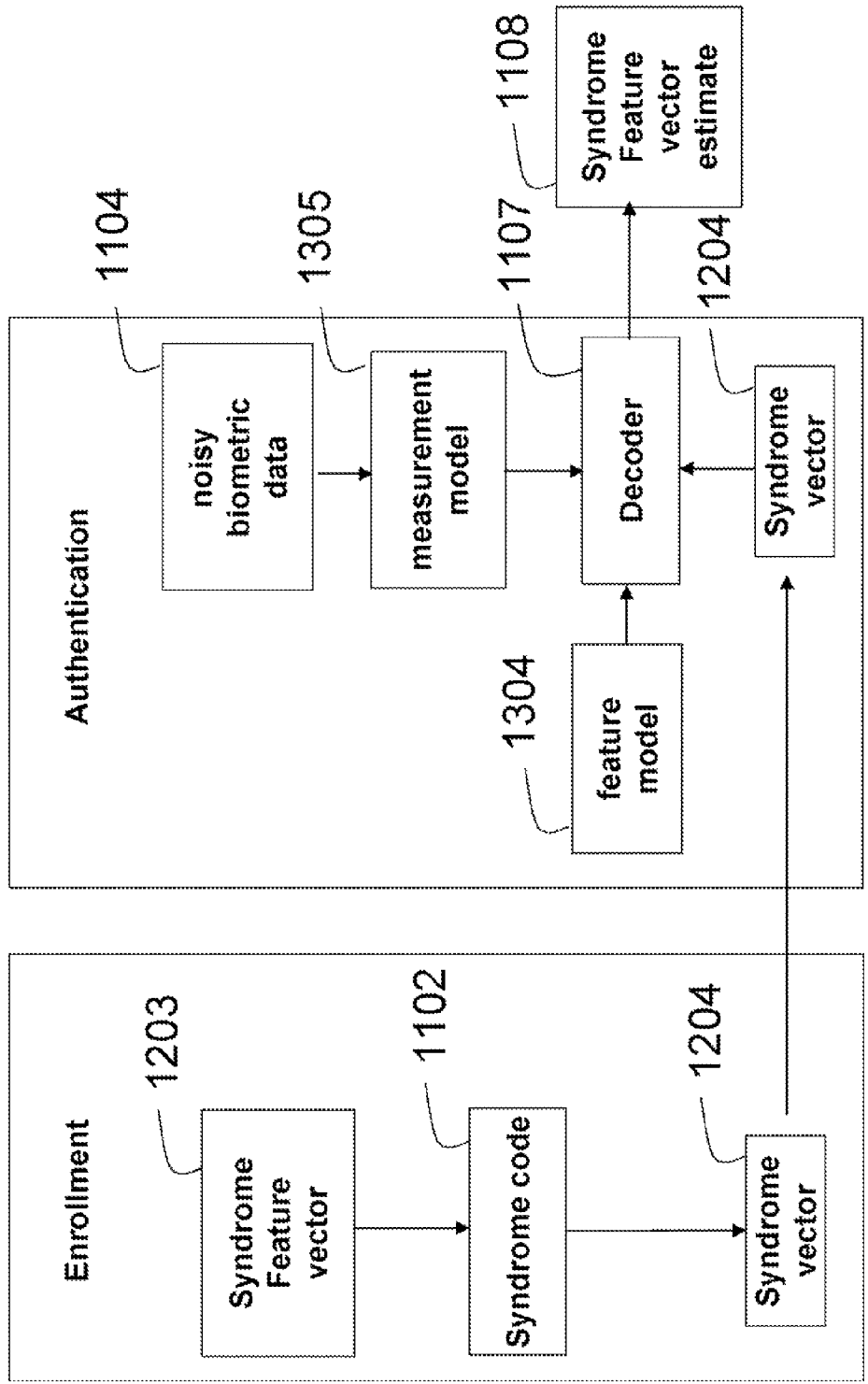

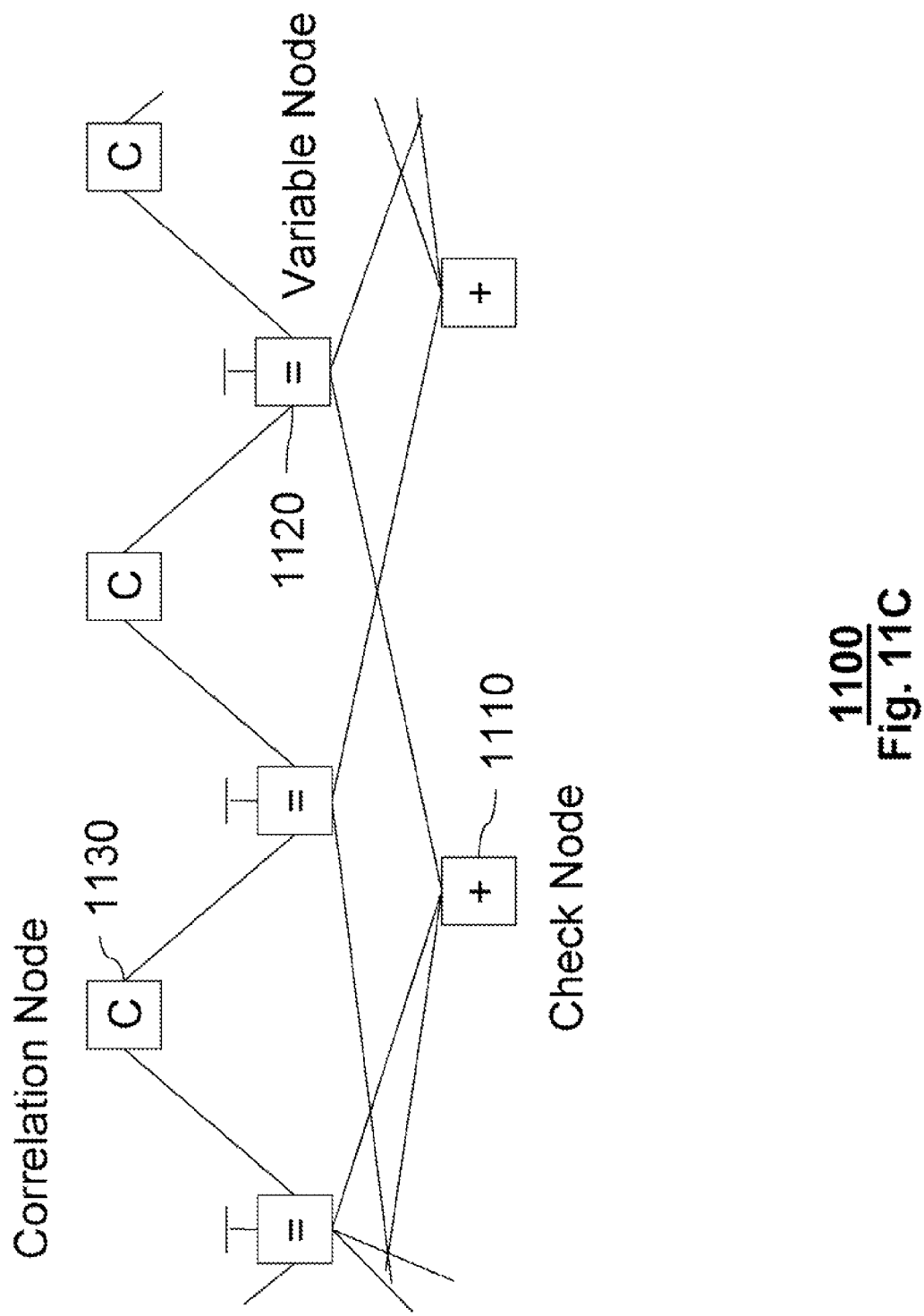

1300

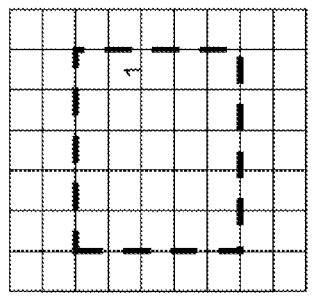
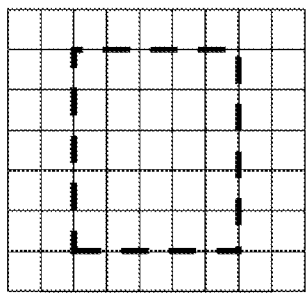
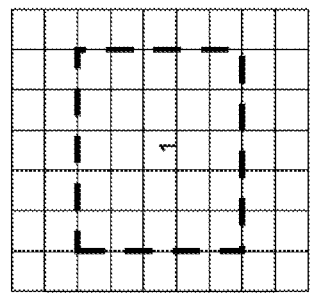
$p_{i,j}$ 1501
Fig 15A
$p_e$ 1502
Fig 15B
$p_s$ 1503
Fig 15C
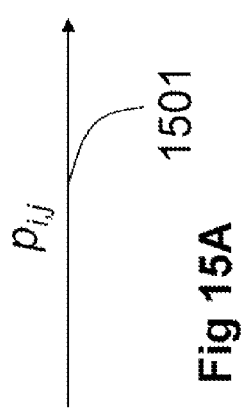
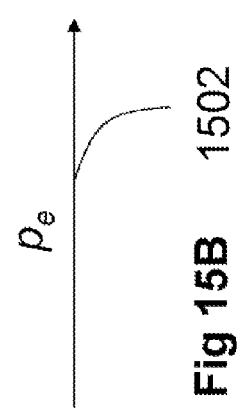
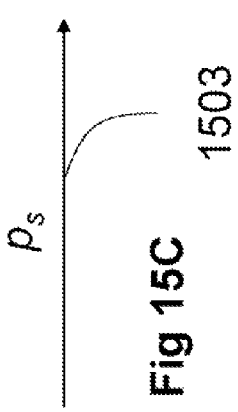
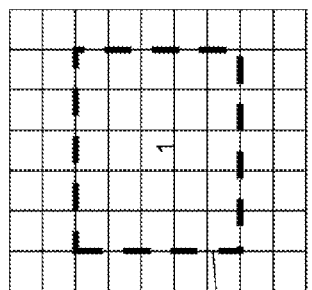
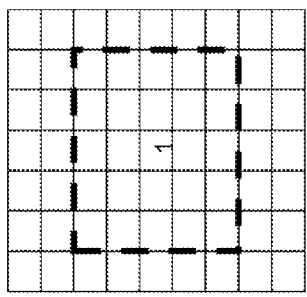
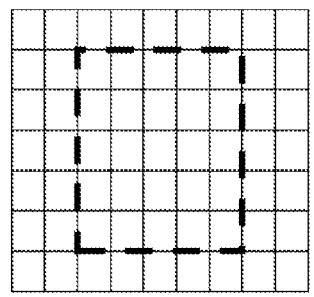
1500

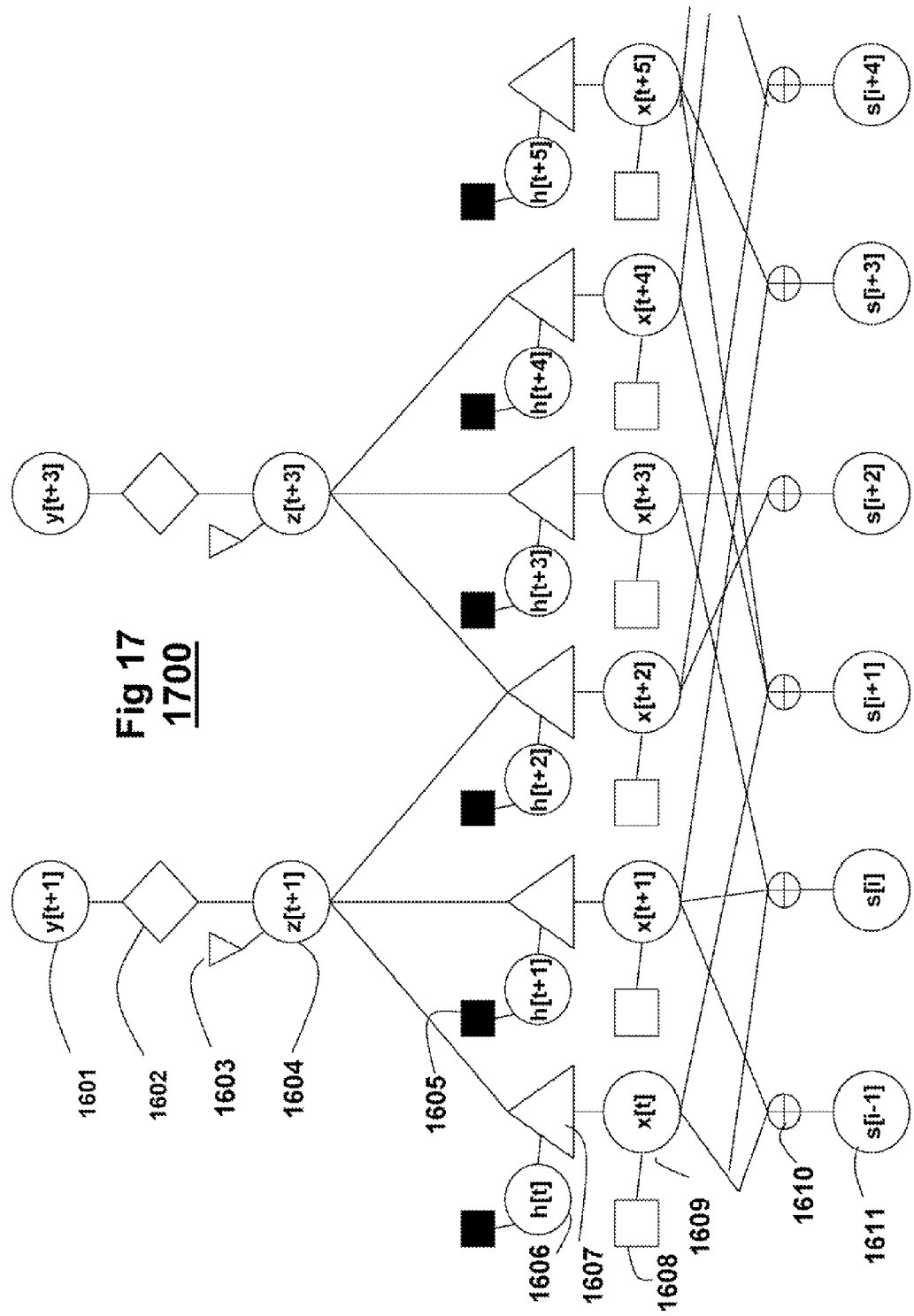

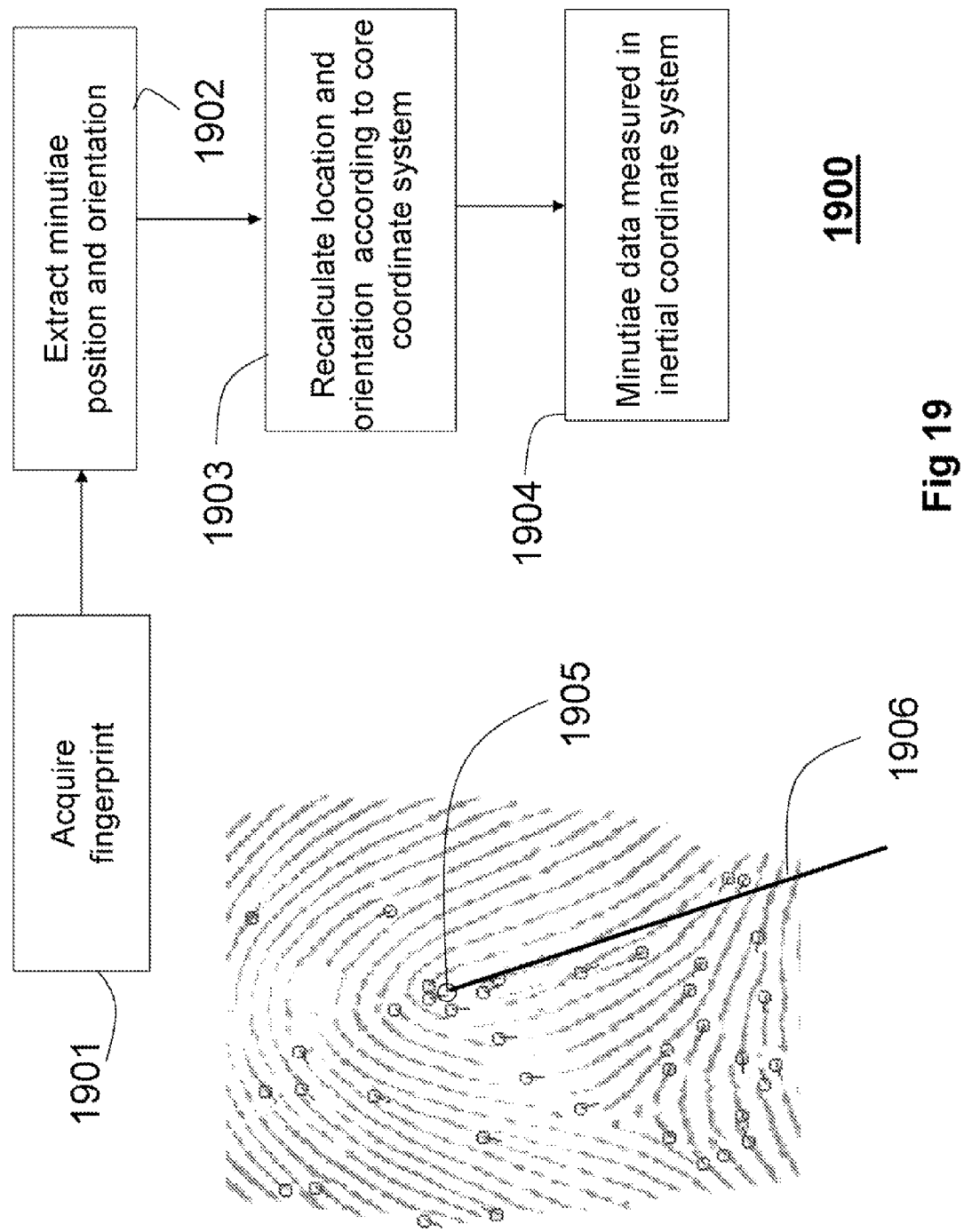

BIOMETRIC BASED USER AUTHENTICATION AND DATA ENCRYPTION

RELATED APPLICATION

This is a Continuation-in-Part Application of U.S. patent application Ser. No. 11/218,261, "Biometric Based User Authentication and Data Encryption," filed by Martinian et al., on Sep. 1, 2005, U.S. Publication 2006-0123241, which is a Continuation-in-Part Application of U.S. patent application Ser. No. 11/006,308, "Biometric Based User Authentication with Syndrome Codes," filed by Martinian et al. on Dec. 7, 2004 now abandoned, U.S. Publication 2006-0123239.

FIELD OF THE INVENTION

The invention relates generally to the fields of cryptography, and more particularly to acquiring, encoding, and storing biometric parameters for user authentication and data encryption.

BACKGROUND OF THE INVENTION

Conventional Password Based Security Systems

Conventional password based security systems typically include two phases. Specifically, during an enrollment phase, users select passwords, which are stored on an authentication device, such as server. To gain access to resources or data during an authentication phase, the users enter their passwords, which are verified against the stored versions of the passwords. If the passwords are stored as plain text, then an adversary who gains access to the system could obtain every password. Thus, even a single successful attack can compromise the security of the entire system.

As shown in FIG. 1 a conventional password based security system 100 stores 115 encrypted 110 passwords 101 in a password database 120 during an enrollment phase 10. Specifically, if X is password 101 to be stored 115, the system 100 actually stores $f(X)$ where $f(.)$ is some encryption or hash function 110. During authentication phase 20, a user enters a candidate password Y 102, the system determines 130 $f(Y)$, and only grants access 150 to the system when $f(Y)$ matches 140 the stored password $f(X)$, otherwise, access is denied 160.

As an advantage, encrypted passwords are useless to an adversary without the encryption function, which are usually very difficult to invert.

Conventional Biometric Based Security Systems

A biometric security system measures physical biometric features to obtain biometric parameters, sometimes called observations. A conventional biometric security system has the same vulnerability as a password based system, which stores unencrypted passwords. Specifically, if the database stores unencrypted biometric parameters, then the parameters are subject to attack and misuse.

For example, in a security system using face recognition systems or voice recognition, all adversary could search for biometric parameters similar to the adversary. After suitable biometric parameters are located, the adversary could modify the parameters to match the appearance or voice of the adversary to gain unauthorized access. Similarly, in security system using fingerprint or iris recognition, the adversary could construct a device that imitates a matching fingerprint or iris to gain unauthorized access, e.g., the device is a fake finger or fake eye.

It is not always possible to encrypt biometric parameters due to not only the possible variability of the underlying biometric features, but also in the way the features are measured. This difference can be termed "noise."

Specifically, biometric parameters X are entered during the enrollment phase. Say that the parameters X are encrypted using an encryption or hashing function $f(X)$, and stored. During the authentication phase, the biometric parameters obtained from the same user can be different. For example, in a security system using face recognition, the cameras used for enrollment and authentication can have different orientations, sensitivities, and resolution. The lighting is usually quite different. Skin tone, hairstyle and other facial features are easy to change. Thus, during authentication, if the newly observed parameters Y are passed through the same encryption function $f$, the result $f(Y)$ will not match $f(X)$ causing rejection. Similar problems exist with other biometrically based user authentication, such as iris and fingerprint patterns.

Error Correcting Codes

An (N, K) error correcting code (ECC) C, over an alphabet Q, includes $Q^K$ vectors of length N. A linear (N, K) ECC can be described either by using a generator matrix G, with N rows and K columns, or by using a parity check matrix H, with N−K rows and N columns. The name 'generator matrix' is based on the fact that a codeword expressed as a vector w, can be generated from any length K input row vector v, by right multiplying the vector v by the matrix G according to w=vG; Similarly, to check if the vector w is a codeword, one can check whether $Hw^T=0$, where a column vector $w^T$ is a transpose of the row w.

In the standard use of error correcting codes, an input vector v is encoded into the vector w, and either stored or transmitted. If a corrupted version of the vector w is received, a decoder uses redundancy in the code to correct for errors. Intuitively, the error capability of the code depends on the amount of redundancy in the code.

Slepian-Wolf, Wyner-Ziv, and Syndrome Codes

In some sense, a Slepian-Wolf (SW) code is the opposite of an error correcting code. While an error-correcting code adds redundancy and expands the data, the SW code removes redundancy and compresses the data. Specifically, vectors x and y represent vectors of correlated data. If an encoder desires to communicate the vector x to a decoder that already has the vector y, then the encoder can compress the data to take into account the fact that the decoder has the vector y.

For an extreme example, if the vectors x and v are different by only one bit, then the encoder can achieve compression by simply describing the vector x, and the positions of the differences. Of course, more sophisticated codes are required for more realistic correlation models.

The basic theory of SW coding, as well as a related Wyner-Ziv (WZ) coding, are described by Slepian and Wolf in "Noiseless coding of correlated information sources," IEEE Transactions on Information Theory, Vol. 19, pp. 471-480, July 1973, and Wyner and Ziv in "The rate-distortion function for source coding with side information at the decoder," IEEE Transactions on Information Theory, Vol. 22, pp. 1-10, January 1976. More recently, Pradhan and Ramchandran described a practical implementation of such codes in "Distributed Source Coding Using Syndromes (DISCUS): Design and Construction," IEEE Transactions on Information Theory, Vol. 49, pp. 626-643, March 2003.

Essentially, the syndrome codes work by using a parity check matrix H with N−K rows and N columns. To compress a binary vector x of length N to a syndrome vector of length K, determine S=Hx. Decoding often depends on details of the particular syndrome code used. For example, if the syndrome code is trellis based, then various dynamic programming based search algorithms such as the well known Viterbi algorithm can be used to find the mostly likely source sequence X corresponding to the syndrome vector S, and a sequence of side information as described by Pradhan et al.

Alternatively, if low density parity check syndrome codes are used, then belief propagation decoding can be applied as described. "On some new approaches to practical Slepian-Wolf compression inspired by channel coding" by Coleman et al., in proceedings of the Data Compression Conference, March, 2004, pages 282-291.

Factor Graphs

In the prior art, codes as described above are often represented by a bipartite graph that is called a "factor graph" see F. R. Kschisclang, B. J. Frey, and H.-A. Loeliger, "Factor Graphs and the Sum-Product Algorithm," IEEE Transactions on Information Theory, vol. 47, pp. 498-519, February 2001 G. D. Forney, Jr., "Codes on Graphs: Normal Realizations," IEEE Transactions on Information Theory, vol 47, pp. 520-549, February 2001, and R. M. Tanner, "A Recursive Approach to Low-Coplexity Codes," IEEE Transactions on Information Theory, vol. 27, pp. 533-547, September, 1981, all incorporated herein by reference.

Generally, a factor graph is a bipartite graph, containing two types of lodes, called "variable nodes" and "factor nodes." Variable nodes are only, connected to factor nodes and vice-versa. Factor nodes are conventionally drawn using squares, and variable nodes are conventionally drawn using circles, and connections between variable and factor nodes are denoted by lines connecting the corresponding circles and squares. Sometimes a symbol, i.e., is drawn inside a factor node to represent the kind of constraint that it enforces.

The variable nodes represent the symbols that are used it the code, and the factor nodes represent the constraints on the symbols. A variable node is only, connected to a factor node if it is subject to the corresponding constraint.

Biometric Parameter Coding Prior Art

Prior art, related to the current invention fills into three categories. First, there is a great deal of prior art describing feature extraction, recording, and use of biometric parameters unrelated to the secure storage of such biometric parameters. Because our invention is concerned with secure storage, and largely independent of the details of how the biometric parameters are acquired, details of this category of prior art are omitted.

The second class of prior art, which is relevant to the invention includes the following systems designed for secure storage and authentication of biometrics, "Method and system for normalizing biometric variations to authenticate users from a public database and that ensures individual biometric data privacy," U.S. Pat. No. 6,038,315; "On enabling secure applications through off-line biometric identification." by Davida, G. I., Frankel, Y., Matt, B. J. in Proceedings of the IEEE Symposium on Security and Privacy, May 1998; "A Fuzzy Vault Scheme," by Jules, A., Sudan, M., in Proceedings of the 2002 IEEE International Symposium on Information Theory, June 2002; U.S. patent application Ser. No. 09/994, 476, "Order invariant fuzzy commitment system," filed Nov. 26, 2001; Juels and Wattenberg, "A fuzzy commitment scheme," in Proc. $5_{th}$ ACM Conf. on Comp. and Commun. Seurity, New York, N.Y., pgs. 28-36, 1999; S. Yang and I. M. Verbauwhede, "Secure fuzzy vault based fingerprint verification system," in Asilomar Conf. on Signals, Systems, and Comp., vol. 1, pp. 577-581, November 2004. U. Uludag and A. Jain, "Fuzzy fingerprint vault," in Proc. Workshop: Biometrics: Challenges arising from theory to practice, pp. 13-16, August 2004.

FIG. 2 shows some of the details of the basic method described in U.S. Pat. No. 6,038,3215. In the enrollment, phase 210, biometric parameters are acquired in the form of a sequence of bits denoted E 201. Next, a random codeword W 202 is selected from a binary error correcting code and additively combined with the parameters E using an exclusive OR (XOR) function 220 to produce a reference R 221. Optionally, the reference R can be further encoded 230. In any case, the reference R is stored in a password database 240.

In the authentication phase 220, a biometric parameters E' 205 are presented for authentication. The method determines 250 the XOR of R with E' to essentially subtract the two to obtain Z=R−E'=W+E−E' 251. This result is then decoded 260 with the error correcting code to produce W' 261. In step 270, if W' matches W, then access is granted 271, and otherwise, access is denied 272.

That method essentially measures the Hamming distance, i.e., the number of bits that are different, between the enrolled biometric E 201, and the authentication biometric E' 205. If the difference is less than some predetermined threshold, then, then access is granted. Because the method stores only the reference R, and not the actual biometric parameters E, the method is secure.

Davida et al. and Juels et al. describe variations of the method shown in FIG. 2. Specifically, both encode the biometric data with an error correcting code during the enrollment phase followed by an operation to secure the resulting codeword. Davida et al. hide the codeword by only sending the check bits, while Juels et al. add some amount of noise referred to as 'chaff.'

U.S. Pat. No. 6,363,485, "Multi-factor biometric authenticating device and method," describes a method for combining biometric data with an error correcting code and some secret information, such as a password or personal identification number (PIN), to generate a secret key. Error correcting codes, such as Goppa codes or BCH codes, are employed with various XOR operations.

In addition to fixed database access control systems illustrated in FIG. 2, a third class of prior art includes using biometrics for data protection, specifically data protection for mobile devices that include memory, such as laptops, PDAs, cellular telephones, and digital cameras. Because mobile devices are easily lost or stolen, it becomes necessary to protect data stored in mobile devices.

Problems with the Prior Art

FIG. 4 illustrates the problems with existing approaches for storing data D 401. In an encoding process 410, biometric parameters P 402 are obtained from a user and used as a key to encrypt 440 data D to produce the ciphertext C 441. Both P and C are saved in storage 450. When a user wishes to decrypt 420 the data 420, biometric parameters P' 460 are obtained from a user and compared to the stored biometric P 402. If P' matches P, 470, then the system allows access and uses P to decrypt the stored ciphertext C to produce the data D 401, otherwise the data are not decrypted 471.

Such a prior art system is only effective as long as the storage medium is not compromised. If adversary can access such media, then the adversary obtains P and decodes the data.

First, the bit-based prior art method provides dubious security. In addition, biometric parameters are often real-valued or integer-valued instead of binary valued. The prior art assumes generally that biometric parameters are composed of uniformly distributed random bits, and that it is difficult to determine these bits exactly from the stored biometric. In practice, biometric parameters are often biased, which negatively affect security. Also, an attack can cause significant harm, even if the adversary recovers only an approximate version of the stored biometric. Prior art methods are not designed to prevent the adversary from estimating the actual biometric from the encoded version.

For example, U.S. Pat. No. 6,038,315 relies on the fact that the reference value R=W+E effectively encrypts the biometric E by adding the random codeword W. However, that method achieves poor security. There are a number of ways to recover E from R. For example, if the vector E has only a few bits equal to one, then the Hamming distance between R and the W is small. Thus, an error correction decoder could easily recover W from R, and hence also recover E. Alternatively, if the distribution of codewords is poor, e.g., if the weight spectrum of the code is small and many codewords are clustered around the all zero vector, then an adversary could obtain a good approximation of E from R.

Second, in addition to dubious security, prior art methods have the practical disadvantage of increasing the amount of data stored. Because biometric databases often store data for many individual users, the additional storage significantly increases the cost and complexity of the system.

Third, many prior art methods require error correction codes or algorithms with a high computational complexity. For example, the Reed-Solomon and Reed-Muller decoding algorithms of the prior art generally have a computational complexity, which is at least quadratic, and often a higher order in the length of the encoded biometric.

Fourth, there are fundamental problems with the basic architecture for the mobile security systems known in the prior art. Mobile security systems such as the one shown in FIG. 4 can only be effective if the mobile security system itself is not compromised. Returning to the example of a mobile security system on a laptop, the security can only be effective if an adversary cannot physically access the media where P and C are stored. If an adversary can access such media, e.g., by removing the hard disk from the laptop, then the adversary immediately obtains P which was the encryption key used to generate and therefore decrypt C.

The main difficulty with prior mobile security systems is that the encryption key corresponding to the user's biometric parameters are stored in the device. Thus, if the device is stolen, then the data can be decoded using the stored parameters.

Fifth, because there are no good methods for performing error correcting coding or syndrome code decoding for the noise structure particular to biometrics, nor has much thought even gone into modeling the noise structure, most prior art on secure biometric system use a memoryless noise model, or other models that oversimplify the nature of the noise, and do not reflect actual operational conditions. That is, the prior art models do not accurately represent the time varying dynamics of biometric features and the acquisition and measurement processes. Instead, those models assume that the noise is memoryless and has no spatial or temporal structure.

Often, biometric features vary from one measurement to another. For example, in fingerprint biometrics "minutiae" points are often used as the feature set. The relative positions and orientations of minutiae can be quite different during enroll merit and authentication. This makes the authentication process difficult. Most straightforward attempts to solve this problem use models that are extremely high-dimensional and therefore impractical for practical implementations.

Therefore, it is desired to provide a model for biometric data including structured noise.

SUMMARY OF THE INVENTION

Biometric parameters, which are acquired for human faces, voices, fingerprints and irises for example, can be used for user authentication and data access control. Biometric parameters cannot be stored in hashed or encrypted forms in databases as is done with passwords because the parameters are usually continuous and can vary from one reading to the next, for the same user. For example, a sampled appearance of a face or fingerprint, or tone of a voice can change over time.

One embodiment of the invention uses syndrome codes to protect the biometric data, e.g., syndrome codes based on Wyner-Ziv or Slepian-Wolf coding. The output of syndrome encoding, which we term a syndrome vector, can be stored securely in a database, while still tolerating the inherent variability of the raw biometric data.

Specifically, the biometric syndrome vector according to the invention has the following properties.

First, the syndrome code effectively hides or encrypts information about the original biometric characteristics so that if the syndrome database is compromised, the stored syndrome vector is of little use in circumventing the security of the system.

Second, given a second noisy, measurement of each biometric, the corresponding stored syndrome vector can be decoded to yield the original biometric parameters, and to decrypt data that was encrypted with the original biometric parameters.

Third, the syndrome coding methodology can be used for user authentication.

A second embodiment of the invention describes a method for efficiently modeling biometric parameters that can vary over time due to variations in the biometric features, and additionally models the measurement process.

The method allows one to accurately exploit relationships between multiple readings of biometric features in a computationally efficient syndrome decoding of such biometric features much better than existing prior art methods.

BRIEF DESCRIPTION OF THE DRAWINGS

FIG. 9 is a block diagram of a process for selecting a feature vector according to an embodiment of the invention;

FIG. 10 is a block diagram for measuring inter-coefficient correlation according to an embodiment of the invention;

FIG. 11A is a block diagram of a biometric encoder for producing a syndrome vector according to an embodiment of the invention during enrollments;

FIG. 11B is a block diagram for a complementary decoder for the encoder of FIG. 11A to be used during authentication according to an embodiment of the invention;

FIG. 11C is a belief propagation factor graph with correlation nodes according to an embodiment of the invention;

FIGS. 15A-15C are block diagrams of variability in measured biometric data according to an embodiment of the invention;

FIG. 17 is a pruned belief propagation factor graph according to an embodiment of the invention;

FIG. 19 is a block diagram for performing alignment of minutiae according to an embodiment of the invention.

DETAILED DESCRIPTION OF THE PREFERRED EMBODIMENT

Embodiments of our invention include the following components: a syndrome encoder and hashing method for securely storing biometric parameters, a syndrome code based encryption method for securely storing data encrypted with biometric keys, and a method of optimizing syndrome codes used for secure biometric applications such as the former two methods.

Syndrome and Hashing Method for Secure Biometric Parameters

Figure 1:
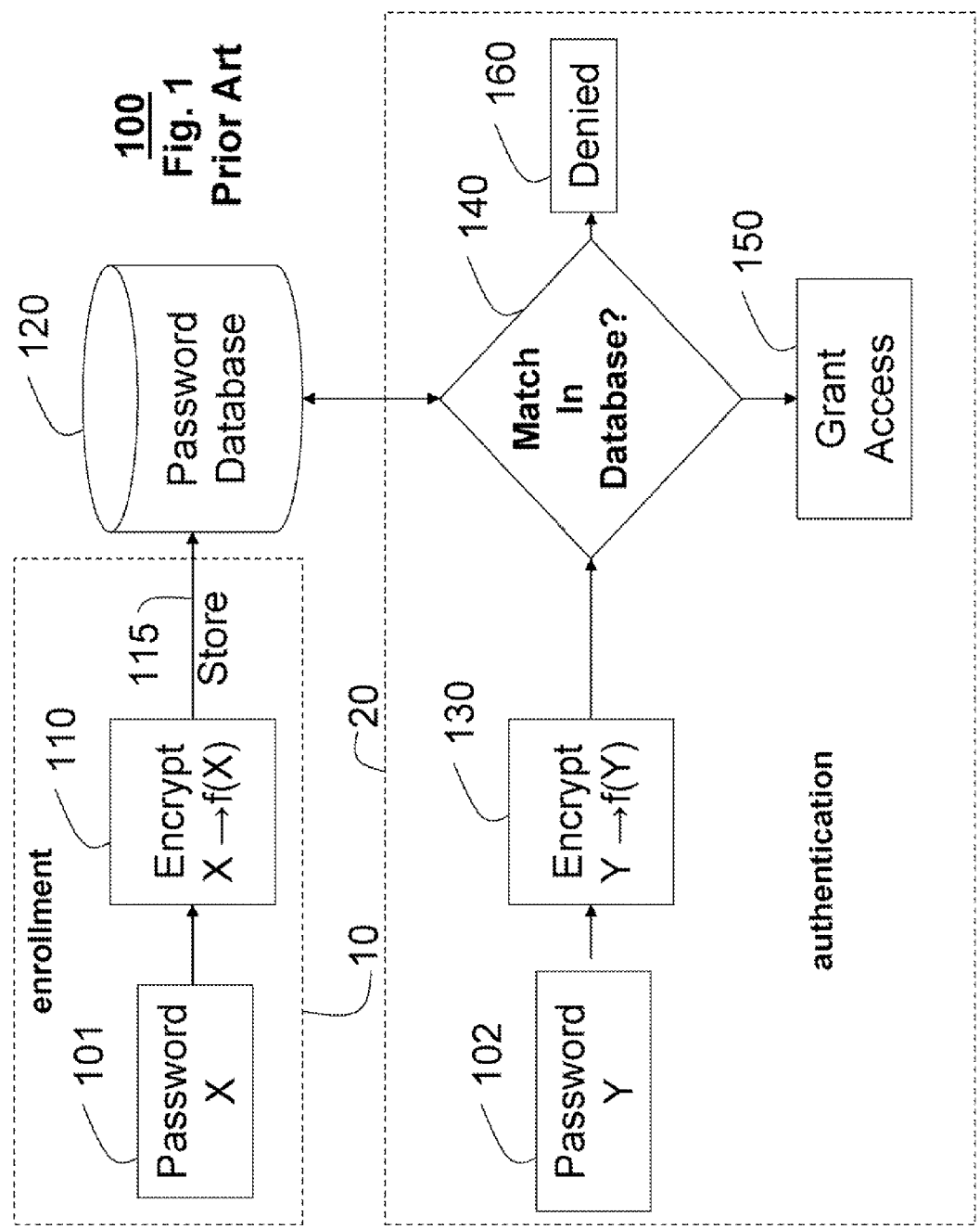
FIG. 1 is a block diagram of prior art password based security system.
Figure 2:
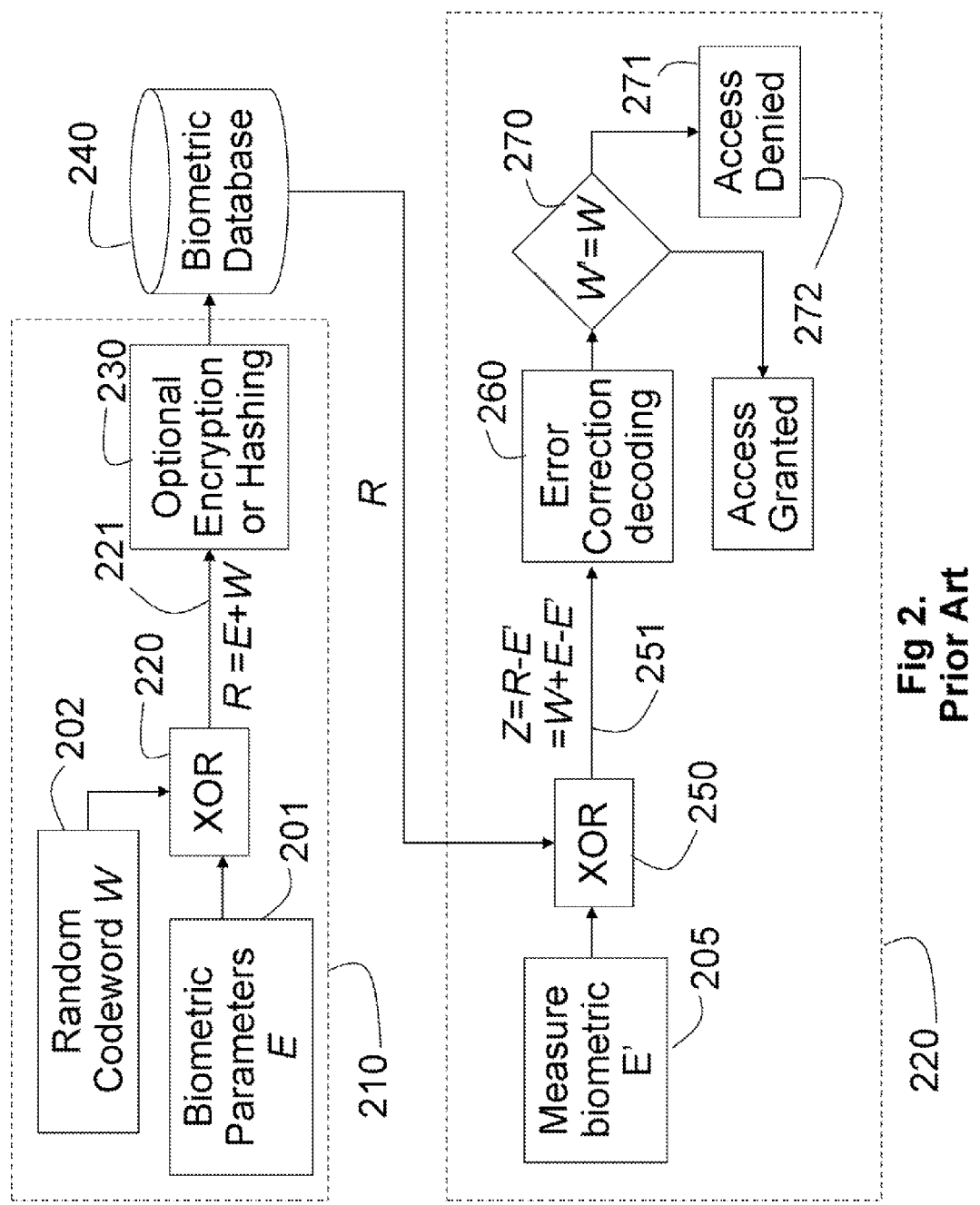
FIG. 2 is a block diagram of prior art biometric based security system.
Figure 3:
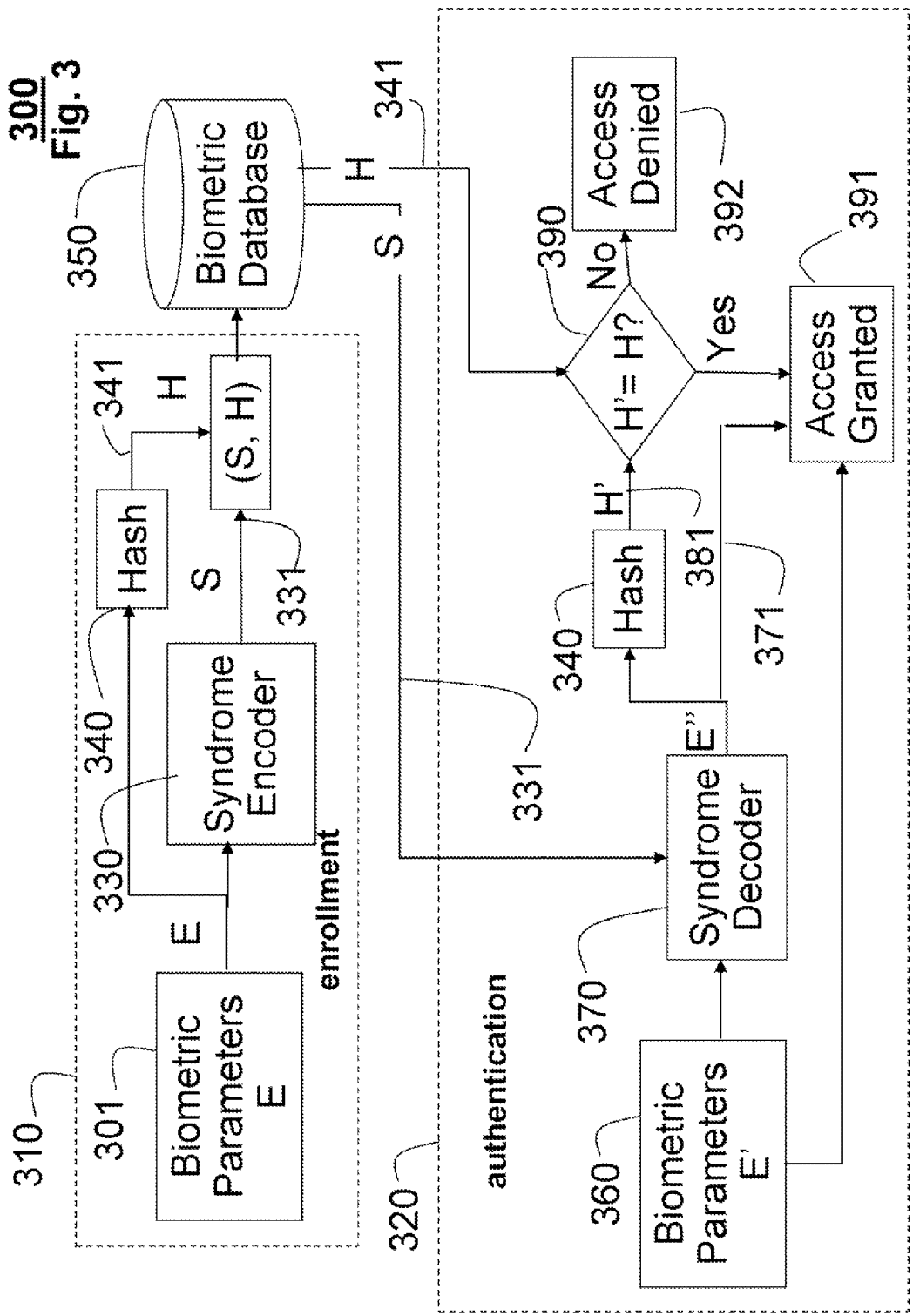
FIG. 3 is a block diagram of a biometric security system according to one embodiment of the invention.
Figure 4:
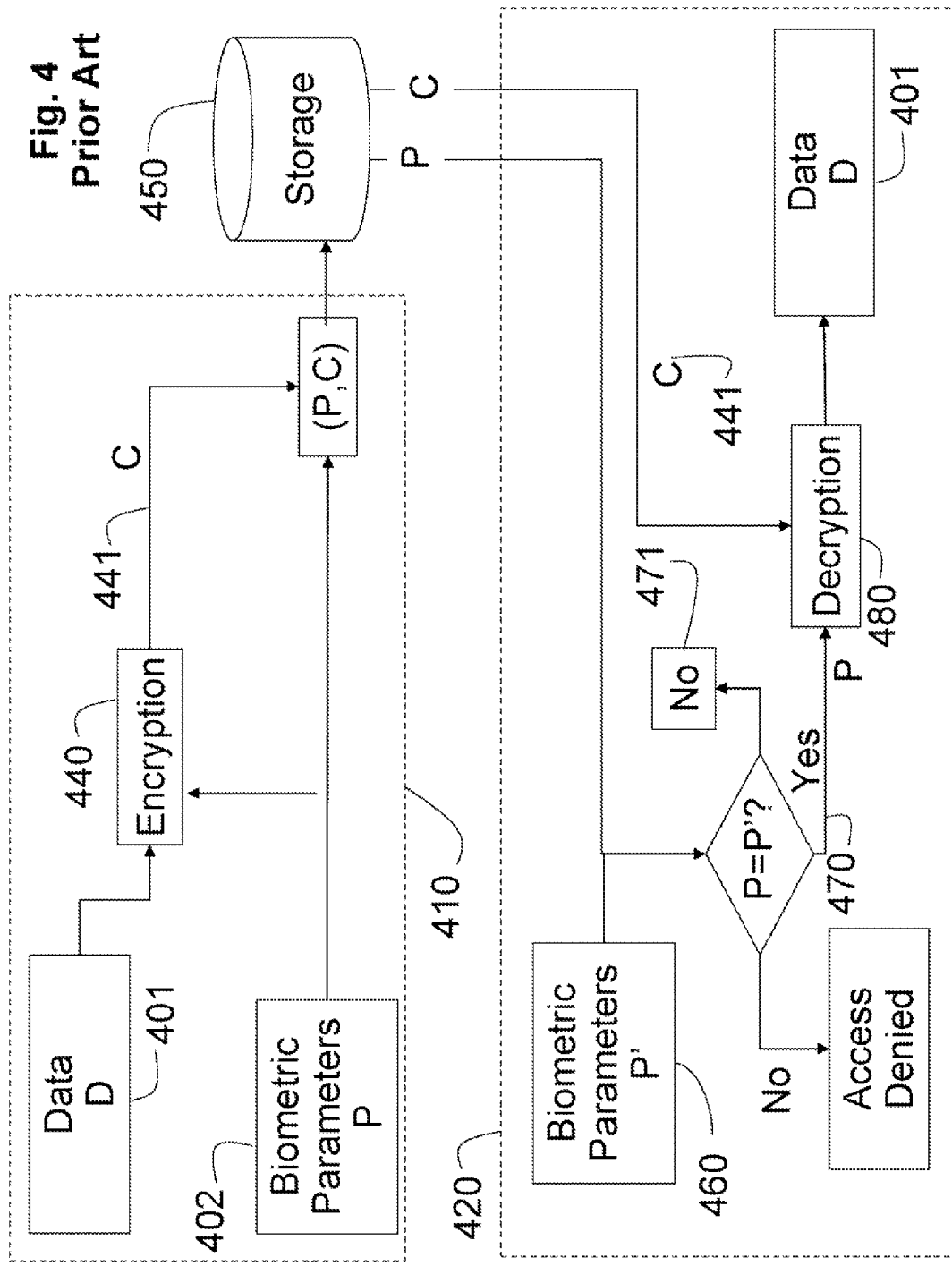
FIG. 4 is a block diagram of a prior art security system for protecting data.

FIG. 3 shows a syndrome and hashing based biometric security system 300 according to our invention. Biometric features of a user are measured to obtain biometric parameters (data or observations). The method according to our invention compresses biometric parameters with a syndrome code to produce a compressed syndrome vector.

Unlike conventional compression, the original biometric data cannot be reconstructed or approximated solely from the syndrome vector produced by the syndrome code. The syndrome vector and a hash of the original biometric parameters are stored in a biometric database.

To authenticate the user, biometric parameters are measured again. The biometric parameters are combined with the stored syndrome vector to decode the original biometric parameters. If syndrome decoding fails, the original biometric parameters are not recovered and the hash of the decoded parameters does not match the stored hash. Therefore, the user is denied access. If syndrome decoding succeeds, then the hash of the original biometric parameters matches the hash of the decoded parameters which verifies the authenticity of the user. The role of the hash is to provide user entry control, to make sure that the biometric parameters provided by the user are good enough to exactly reconstruct the original biometric parameters. While both the syndrome encoder and hash are a many-to-one mapping, the syndrome code has a structure that is useful in reconstructing the original biometric parameters. On the other hand, the hash function can be, e.g., a cryptographic hash, which provides no useful information in estimating the original biometric.

Enrollment Phase

In the enrollment phase 310, biometric data are acquired of physical features of a user. For example, the biometric data are derived from an image of a face, a recording of speech, an image of a fingerprint, or a scan of an iris.

Hereinafter, biometric data refers to the raw biometric signal sensed, measured or otherwise acquired from the physical features of the user. Features are extracted from the biometric data. The features are arranged in a d-dimensional feature vector. The feature vector forms enrollment biometric parameters 301. Methods for extracting features from various forms of biometric data are well known in the art, as described above. Conversion of the feature vector to biometric parameters and an optimal syndrome code are described in greater detail below.

The biometric parameters E 301 are encoded using a syndrome encoder 330 to produce an enrollment syndrome vector S 331. Next, a message authentication code or hash function is applied 340 to the biometric parameters E to produce an enrollment hash H 341. The hash function can be the well-known MD5 cryptographic hash function described by Ron Rivest in "The MD5 Message Digest Algorithm," RFC 1321, April 1992. The enrollment syndrome vector—hash pair (S, H) 331, 341 is stored in a biometric database 350.

Any type of syndrome code, e.g., the SW code or the WZ code described above, can be used. The preferred embodiment of the invention uses codes derived from so-called "repeat-accumulate codes," namely "product-accumulate codes," and codes that we call "extended Hamming-accumulate codes."

We refer generally to these as serially concatenated accumulate (SCA) codes. For more information on these classes of codes in a general sense, see J. Li, K. R. Narayanan, and C. N. Georghiades, "Product Accumulate Codes: A Class of Codes With Near-Capacity Performance and Low Decoding Complexity," IEEE Transactions on Information Theory, Vol. 50, pp. 31-46. January 2004; M. Isaka and M. Fossorier, "High Rate Serially Concatenated Coding with Extended Hamming Codes," submitted to IEEE Communications Letters, 2004; and D Divsalar and S. Dolinar, "Concatenation of Hamming Codes and Accumulator Codes with High Order Modulation for High Speed Decoding," IPN Progress Report 42-156, Jet Propulsion Laboratory, Feb. 15, 2004.

U.S. patent application Ser. No. 10/928,448, "Compressing Signals Using Serially-Concatenated Accumulate Codes," filed by Yedidia, et al. on Aug. 27, 2004 incorporated herein by reference, describes the operation of our preferred syndrome encoder based on SCA codes as used by the present invention.

Our syndrome encoder 330 for the biometric parameters 301 has a number of advantages. The syndrome encoder 330 can operate on integer-valued valued inputs. In contrast, prior art encoders generally operate on binary valued inputs. The syndrome encoder has very high compression rates to minimize the storage requirements of the biometric database 350. The syndrome encoder can be designed to be rate-adaptive, and can operate in an incremental fashion.

Authentication Phase

In an authentication phase 320, biometric data are again acquired from the user. Features are extracted to obtain authentication biometric parameters E' 360. The database 350 is searched to locate the matching enrollment syndrome vector S 331 and enrollment hash H 341 for this user.

The search can check every entry (S-H pairs) in the database 350, or a heuristically ordered search can be used to accelerate the process of finding a matching entry. Specifically, if we denote the $i^{th}$ syndrome vector—hash pair in the database as $(S_i; H_i)$ then an exhaustive search first applies syndrome decoding to E' and $S_I$ and compares the hash of the syndrome decoder output to $H_1$. If access is denied, the same process is attempted with $(S_2, H_2)$ then $(S_3, H_3)$, etc, until all entries have been tried or access was granted.

If extra information such as an enrollment user-name is available, then the search can be accelerate. For example, the hash of the enrollments user-name (not to be confused with the hash H of the biometric parameters) is stored with the pair S and H during the enrollment phase. Then, in the system determines the hash of the authentication user-name, and search the database for an S-H pair with a matching hashed enrollment user-name, and attempts to authenticate E' with the resulting S-H pair.

Specifically, a syndrome decoder 370 is applied to the enrollment syndrome vector S, with the authentication parameters E' 360 acting as 'side' information. Syndrome decoders are known in the art generally. Typically, decoders that use belief propagation or turbo codes have excellent error resiliency with low complexity. An output of the syndrome decoder 370 are decoded enrollment parameters E" 371. The decoded value E" 371 is an estimate of the original biometric parameter E 301 that were used to produce the syndrome vector S 331. The hash function 340 is applied to E" 371 to produce an authentication hash H' 381.

The enrollment and authentication values H 341 and H' 381 are compared 390. If the values do not match, then access is denied 392. Otherwise, the value E" 381 substantially matches the original biometric E 301. In this case, the user can be granted access 391.

In addition, a direct comparison can be made between the decoded parameters E' 381 and the authentication biometric parameters E' 360 to authenticate the user. For example, if E' and E" correspond to biometric parameters in a face recognition system, conventional algorithms for comparing the similarity between faces could be applied to the parameters E' and E".

Syndrome Based Data Encryption

Figure 5:
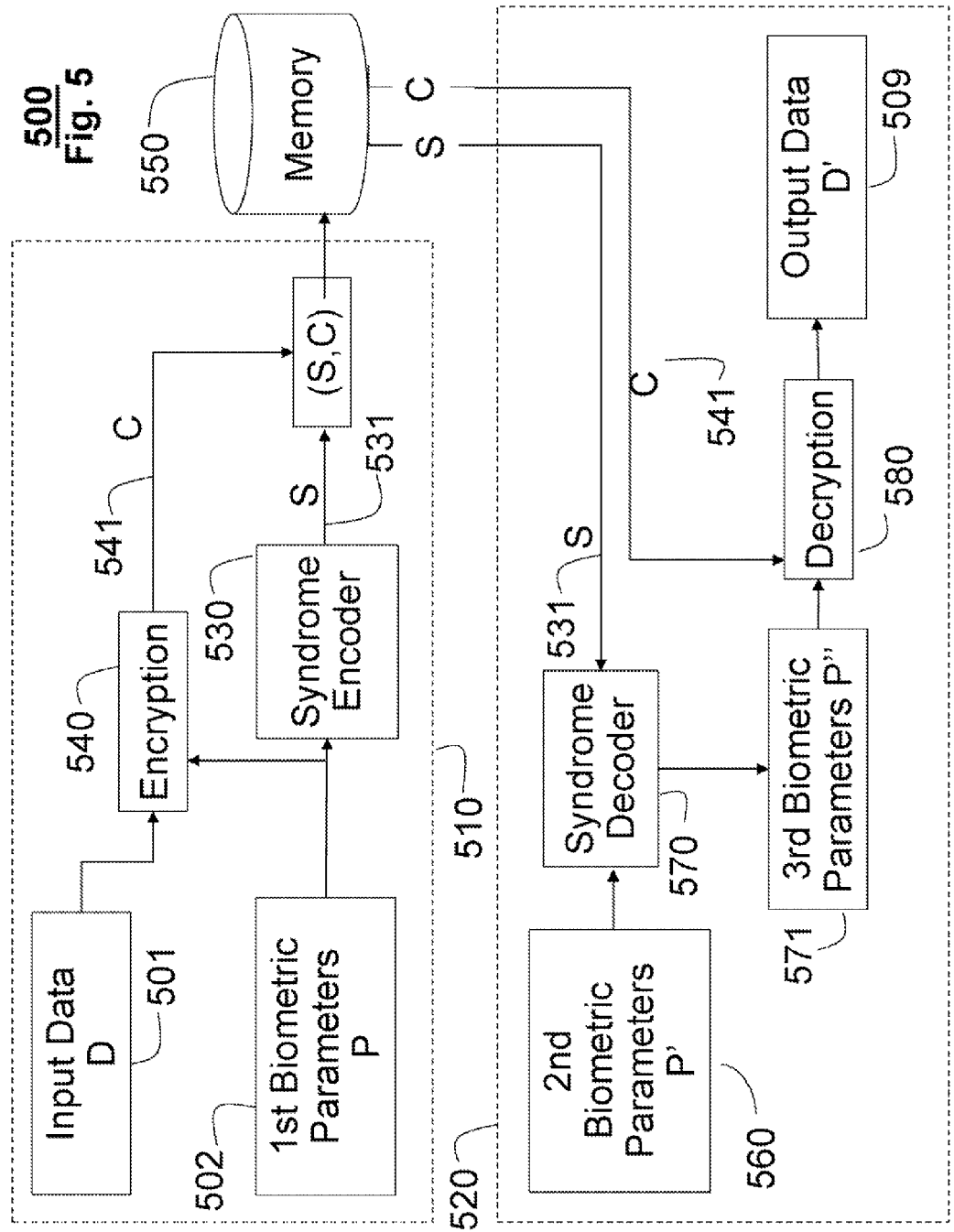
FIG. 5 is a block diagram of a data security system according to an embodiment of the invention.

FIG. 5 shows a method 500 for encoding 510 and decoding 520 data 501. In the encoding process 510, first biometric parameters P 502 are obtained from a first user. The parameters are used to encrypt 540 input data, D 501 to produce the ciphertext C 541. In contrast to the prior art, however, the first biometric parameters P are never stored in a memory. Instead, a syndrome encoder 530 encodes the first biometric parameters P to produce a syndrome vector S 531, and the pair (S, C) are associated with each other, and stored in a memory 550. In one embodiment of the invention, the input data are the raw biometric data acquired from a user during an enrollment process.

When a person wishes to decrypt 520 the ciphertext 541, second biometric parameters P' 560 are acquired from a second user. The stored syndrome vector C 531 is syndrome decoded using with second biometric parameters to produce third biometric parameters P" 571. The third biometric parameters P" are then used to decrypt 580 the ciphertext 541 to produce output data D' 509. Obviously, if the second or third biometric parameters do not match the first biometric parameters, the output data D' 509 do not match the input data D 501. The output data will only match the input data exactly if the first user and the second user are the identical person.

In one embodiment of this invention, the hash H of the biometric parameters can also be stored, as described above. Checking that the hashes match confirms that decryption was successful. Without the hash, security is maintained but the decoder cannot confirm that decryption was successful. For many types of source data, the hash is not necessary because the file that results from incorrect decryption does not correspond to anything useful.

The method has the following advantages. If an adversary gains access to the syndrome vector and the ciphertext (S, C) the data cannot be decrypted. This is because the encryption key, i.e. the first biometric parameter's P cannot be recovered from the syndrome vector. In addition, because of error correcting properties of syndrome codes, even if the second biometric parameters P' differs slightly from the first biometric parameters P, a suitably designed syndrome decoder can successfully produce the third biometric parameters P" that are exactly the same as the first biometric parameters used as the encryption key P 502.

Syndrome encoding provides an effective way to securely store biometric parameters, and can be applied to other methods of securely storing biometric information. It should be noted that feature vectors can be extracted from biometric data. Therefore, any of the above described biometric parameters can be replaced by a corresponding feature vector.

An additional advantage of storing the biometric parameters in an encrypted form is that this enables secure biometric storage applications to operate in different feature vectors from those used in biometric recognition applications. For example, fingerprints recognition systems often use a feature vector based on so-called 'minutiae' extracted from an image of a fingerprint. Similarly, iris recognition systems sometimes use features extracted from passing the iris image through a bank of Gabor filters.

In many cases, the ideal feature vector for biometric recognition, e.g., face recognition or fingerprint identification, can be different than the ideal feature vector for syndrome encoding/decoding. In many cases this is due to the fact that a process for training a classifier for a recognition or identification system, e.g., a classifier based on a Gaussian mixture model (GMM), neural networks or hidden Markov models, produce different feature vectors from a process used for training a histogram used with a belief propagation decoder of syndrome encoders and decoders as described herein.

Figure 6:
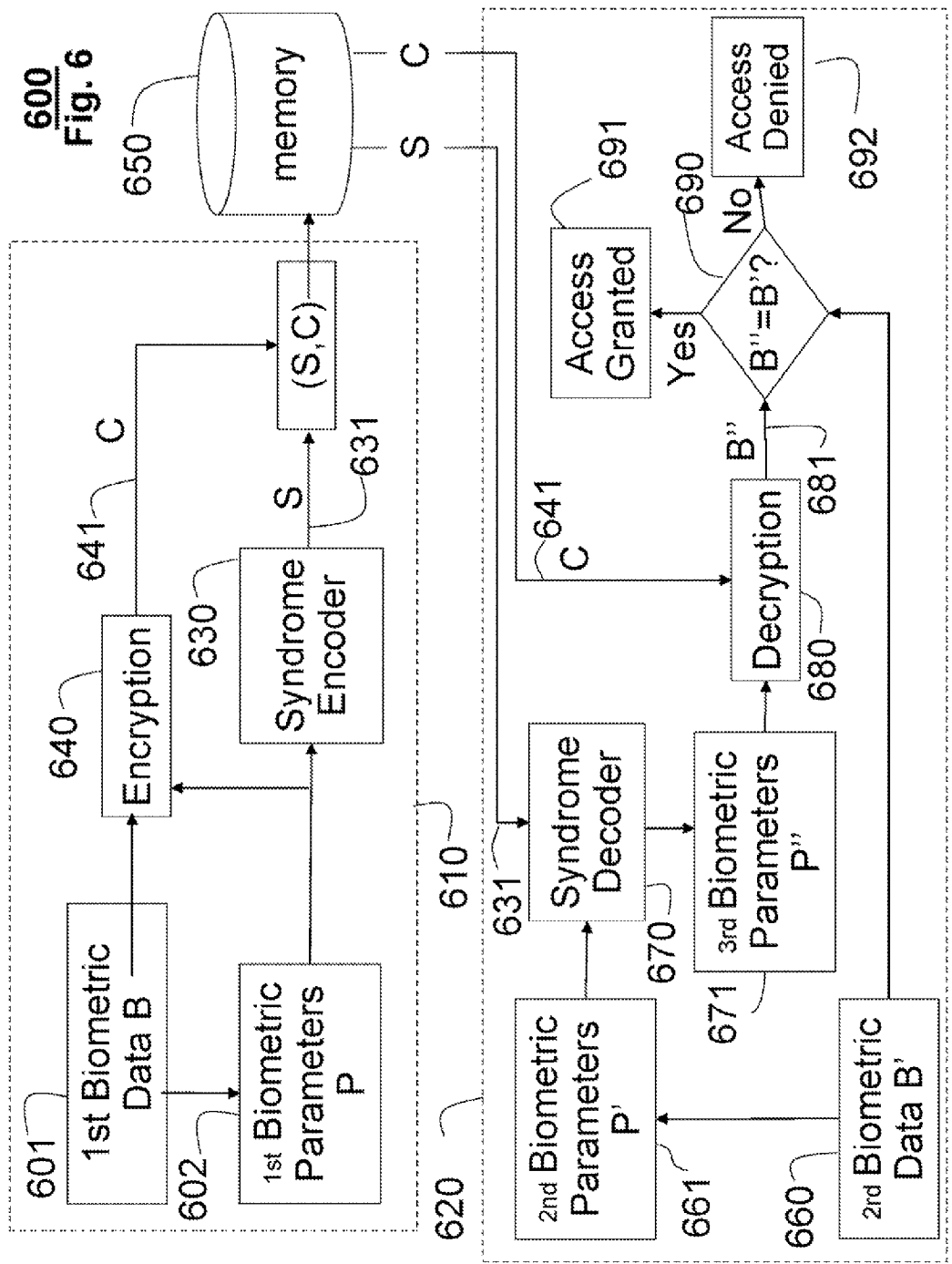
FIG. 6 is a block diagram of a security system according to an embodiment of the invention.

FIG. 6 shows a method 600 for storing an encrypted version of input biometric data 601. As described above, the biometric data are derived from the raw signal used to measure or sense biometric characteristics of a user.

In the enrollment phase 610 of an access control system, for example, first biometric data B 601 are acquired from a user. Then, a feature vector of first biometric parameters P 602 is obtained from the first biometric data B 601. The first biometric data P are encrypted 640 using the first biometric parameters P as the encryption key to produce ciphertext C 641. In addition, the first biometric parameters are syndrome encoded to produce a syndrome vector S 631. The associated pair (S, C) is then stored in a biometric database 650.

In an authentication phase 620 authentication second biometric data B' 660 are obtained from a user. The second data are used to generate a feature vector of the second biometric parameters P' 661. Then, a syndrome decoder 670 decodes the first biometric parameters to produce third biometric parameters P" 671. The third biometric parameters are then used as a key to decrypt 680 the ciphertext C to produce third biometric data B" 681. Then, the authentication biometric data B' and the decoded biometric data B" are compared by a biometric recognition method 690 to determine whether access to a particular function is granted or denied 692. As before, the access is only granted if the first and third biometric data are exactly identical, i.e., the first and second users are to same person.

In another variation, the comparison step can use feature vectors extracted from the biometric data. The feature vectors do not need to be same the as the biometric parameters. Furthermore, the two feature vectors that are being compared only need to be substantially the same because the verification step may use a totally different process. Thus, the feature vectors can admit a wider range in variation in the biometric data that characterize a particular user over time.

We list some advantages of the process shown in FIG. 6. The authentication system can use a conventional recognition system in step 690. In addition, the biometric parameters P and P' used by the syndrome encode/decoder can be selected independently of parameters or feature vectors used by the biometric verification step 690. Furthermore, syndrome encoding is an effective method of securely storing biometric parameters. However, the method shown in FIG. 6 can also be applied to other methods of securely storing biometric parameters.

Designing Optimal Syndrome Codes for Secure Biometric Parameters

In general there is a trade-off between security and accuracy in using syndrome codes to protect biometric parameters and biometric features. Specifically, a key parameter of any syndrome code is the number of bits in the syndrome vector. A syndrome vector with a large number of bits conveys more information about the biometric data and makes it easier to tolerate noise and variations in the biometric data. In contrast, a smaller syndrome vector gives less information to an adversary but is more prone to error.

At one extreme, when the length of the syndrome vector is substantially the same as the length of the underlying biometric data, any amount of noise can be tolerated because the original biometric data can be exactly recovered from only the syndrome vector. Of course, in this case an adversary obtains the syndrome vector can possibly also recover the biometric data, compromising the security of the system.

At the other extreme, a syndrome vector of a very small number of bits provides extremely good security, in the sense that the adversary cannot recover the biometric data from the syndrome vector. However, in this case, permissible variations between the enrollment biometric data and the authentication biometric data are limited.

Obviously, a syndrome based encoder and decoder should select a length for the syndrome vector that balances security and toleration of biometric variations. However, a carefully designed syndrome code can improve error resiliency.

Figure 12:
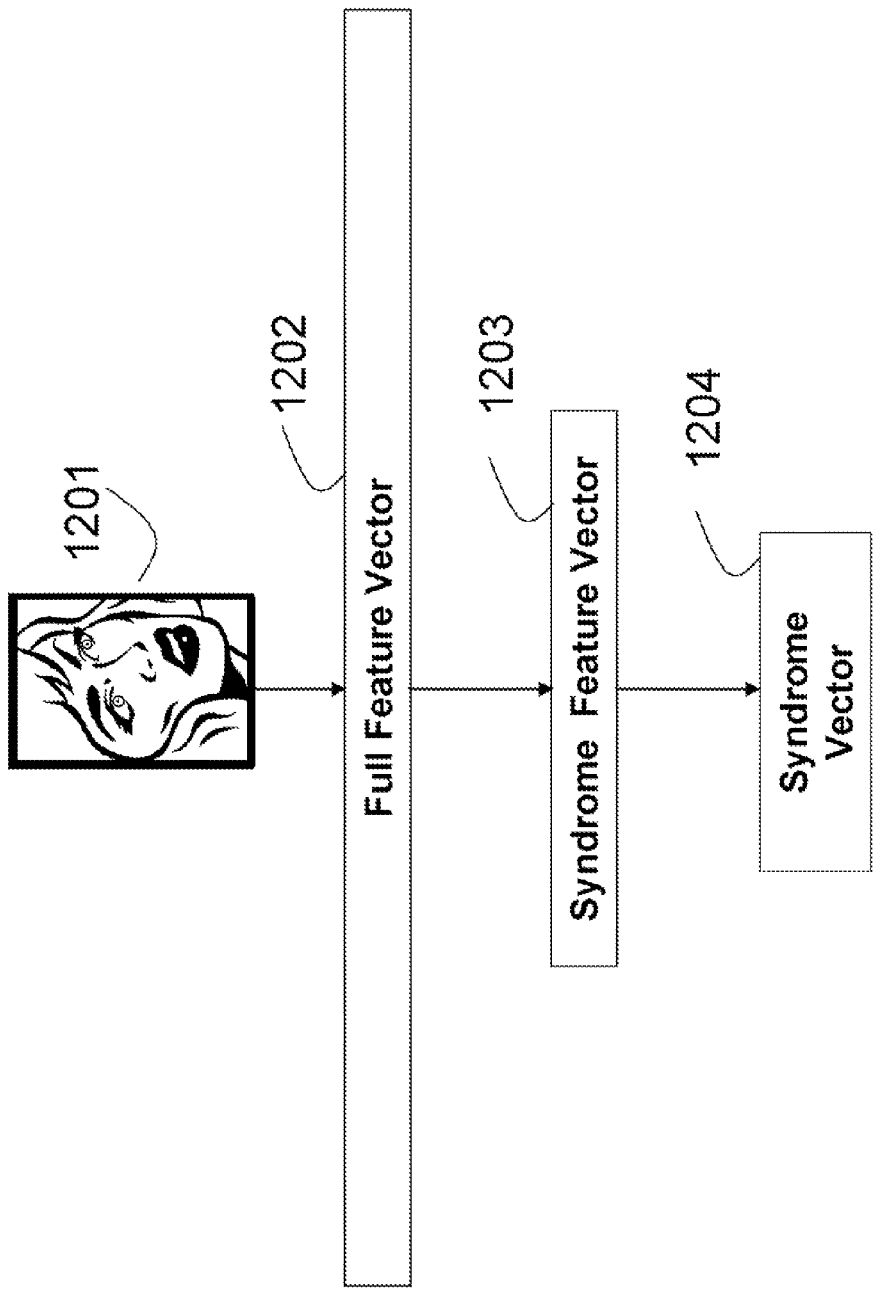
FIG. 12 is a block diagram indicating dependency relationships between biometric features, full feature vector, syndrome feature vector, and encoded syndrome vector according to an embodiment of the invention.

The design and operation of the syndrome code is described with the following terminology as shown in FIG. 12. The biometric data 1201 can be, e.g., an image of a face or fingerprint. A full feature vector 1202 is extracted from the training biometric data. The full feature vector 1202 is reduced down to a syndrome feature vector 1203. The syndrome feature vector captures those parts of the fall feature vector that the designer decides are appropriate for syndrome encoding and decoding. A syndrome code is used to encode the syndrome vector 1204 from the syndrome feature vector. The syndrome feature vector 1203 plays the role of the biometric parameter E 310 in FIG. 3 while the syndrome vector is S 331.

Biometric Statistical Model

Figure 13:
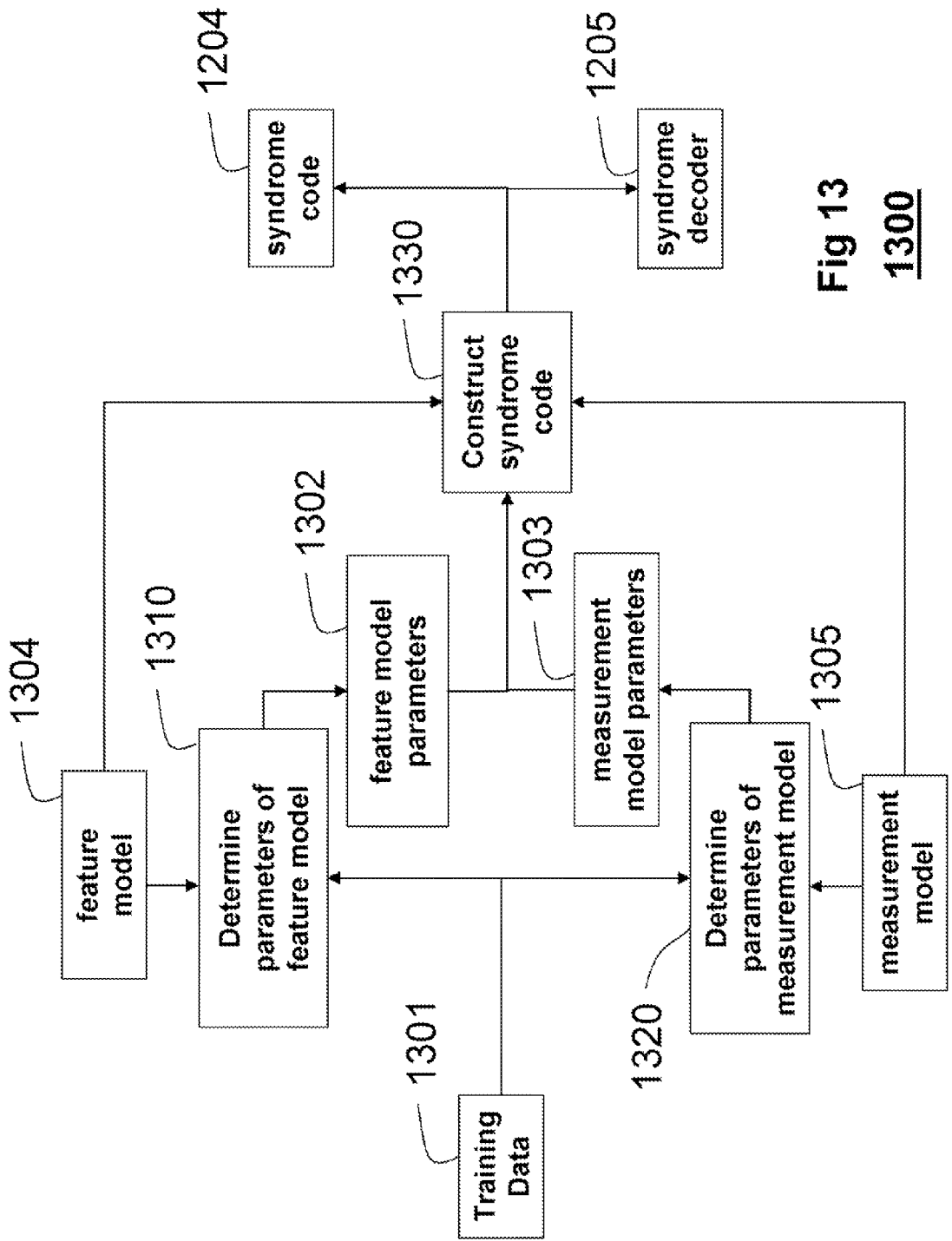
FIG. 13 is a block diagram of a process for constructing a syndrome code according to an embodiment of the invention.

FIG. 13 shows a process 1300 for constructing the syndrome code 1204 and a corresponding decoder 1205 (i.e., encoder and decoder) according to an embodiment of the invention. The training biometric data 1301 are acquired. Parameters 1302 of a selected feature model 1304 are determined 1310 from the training data. In terms of codecs, the feature model essentially is the "source" model. Similarly, parameters 1303 of a selected measurement model 1305 are determined 1320. The measurement model effectively is the "channel" model. The parameters 1302-1303 and models 1304-1305 are then used to construct the syndrome code and corresponding decoder. It should be noted that that the channel model is designed to cope with the structured noise in the measurement process. The noise can be due, e.g., to changes in the features of the biometric data as observed at different measurement instances as well as insertions and deletions of features between instances.

While many tools of machine learning can help in the above design process, this problem is quite different from many modeling problems in machine learning because the resultant model has a "hard" feature vector that is appropriate for syndrome encoding. We discuss the difference between "hard" and "soft" feature vectors in greater detail below.

As shown in FIG. 12, the syndrome feature vector 1203 is typically of a reduced size to make syndrome decoding tractable. To construct the syndrome code, we can apply a density evolution to a degree distribution. The syndrome code is further refined to take into account features such as a finite block-length of the syndrome feature vector 1203, or the need to use a variable-rate code to match the syndrome vector 1204 to the variations in biometric features across users.

After the syndrome code has been constructed selected, we construct an iterative belief propagation decoder as described below.

Quantization

Figure 7:
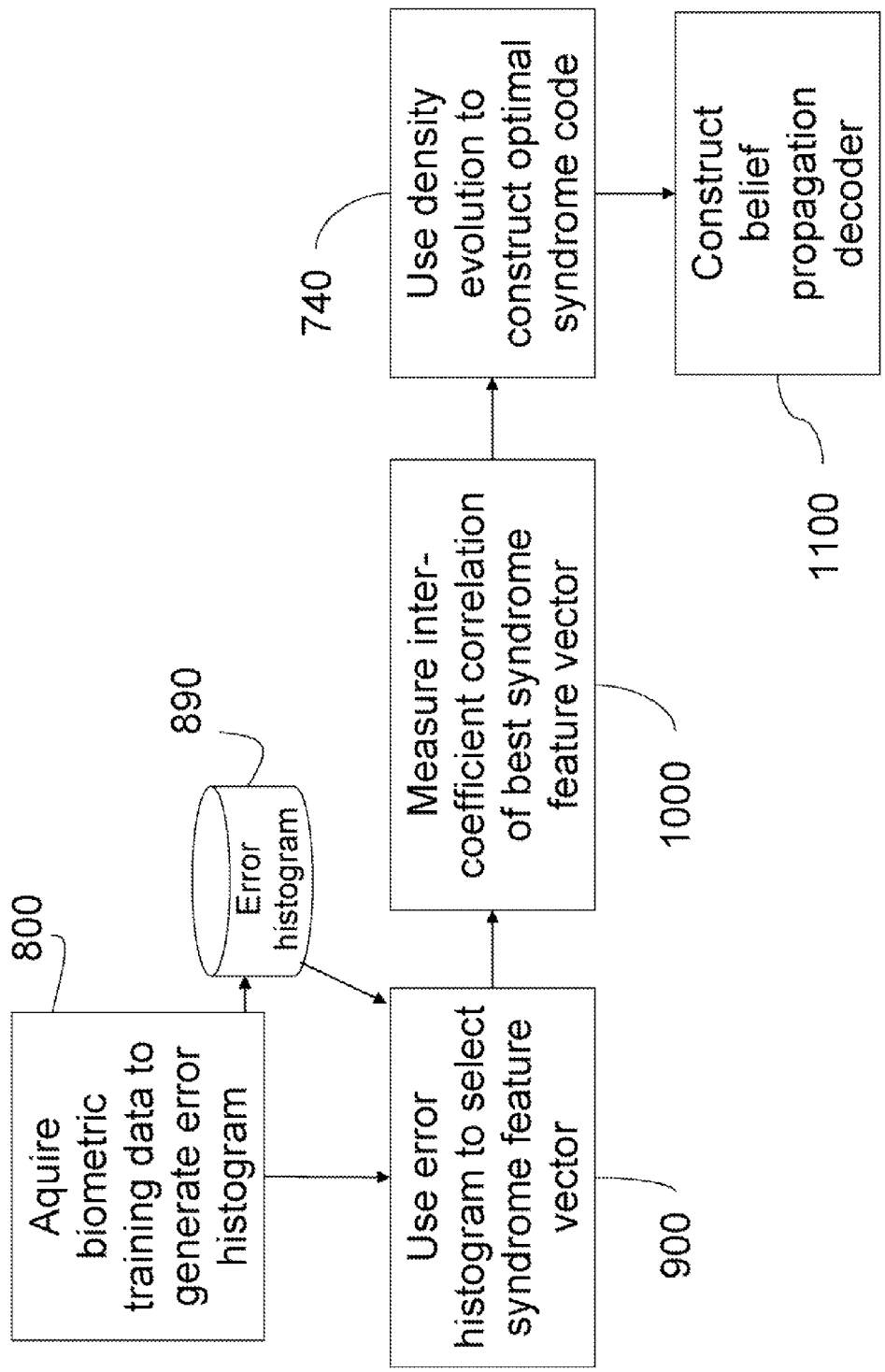
FIG. 7 is a block diagram of a process for constructing a syndrome code according to an embodiment of the invention.

Before detailing an instance 700 of the process 1300, which is shown in FIG. 7, we first define the following terminology that distinguishes between the use of biometric data during enrollment and during authentication. We use the term 'hard' feature vector to refer to a quantized version of a feature vector, act the term 'soft' feature vector to refer to either an unquantized feature vector or a version of the feature vector that is quantized finely.

Quantization is used because some biometric parameters can include integers and real numbers over a relatively large numeric range. Encryption, key generation, and other authentication processes work best with integers over a small range.

The reason that we distinguish between a 'hard' feature vector and a 'soft' feature vector is that the syndrome vector is derived from a 'hard' feature vector. Therefore the 'hard' feature vector is usually quantized. In contrast, during the authentication phase, the syndrome decoder may combine a 'soft' feature vector with the syndrome vector to decode the 'hard' feature vector. Therefore, the 'soft' feature vector does not need to be quantized or may be quantized differently to decrease errors in the system. For example, the use of a soft feature vector makes it possible for the syndrome decoder to take as inputs likelihoods of each feature rather than a hard decision of the most likely choice of each feature.

In general, there are multiple ways to extract a full feature vector from biometric data, as well as multiple ways to extract 'hard' and 'soft' feature vectors from the full feature vector. Therefore, we apply the process of FIG. 13 to each possibility and select the syndrome feature vector 1304 that yields the best overall results during training.

FIG. 7 shows the detail of an instance of process 1300 for constructing an optimal syndrome code where the statistical model for the biometric features 1304 represents a Markovian relationship between biometric features. Training biometric data are acquired 800. The biometric data are used to generate an error histogram 890. The error histogram is used to select 900 the syndrome feature vector, in this contexts we use the term "full feature vector" 1202, see FIG. 12, to denote all biometric parameters, and the term "syndrome feature vector" 1203, to refer to a subset of the full feature vector. The syndrome feature vector can be transformed into an arbitrary feature space.

After the syndrome feature vector 1203 is selected, we measure 1000 a correlation between different coefficients of the syndrome feature vector. By using the error statistics for the syndrome feature vector and the inter-coefficient correlation, we then apply density evolution 740 to search for a degree distribution that yields art optimal syndrome 1204 code of a given length After the syndrome feature vector and syndrome code have been selected, we construct 1100 a belief propagation decoder that exploits the inter-coefficient correlation.

Constructing an Error Histogram

Figure 8:
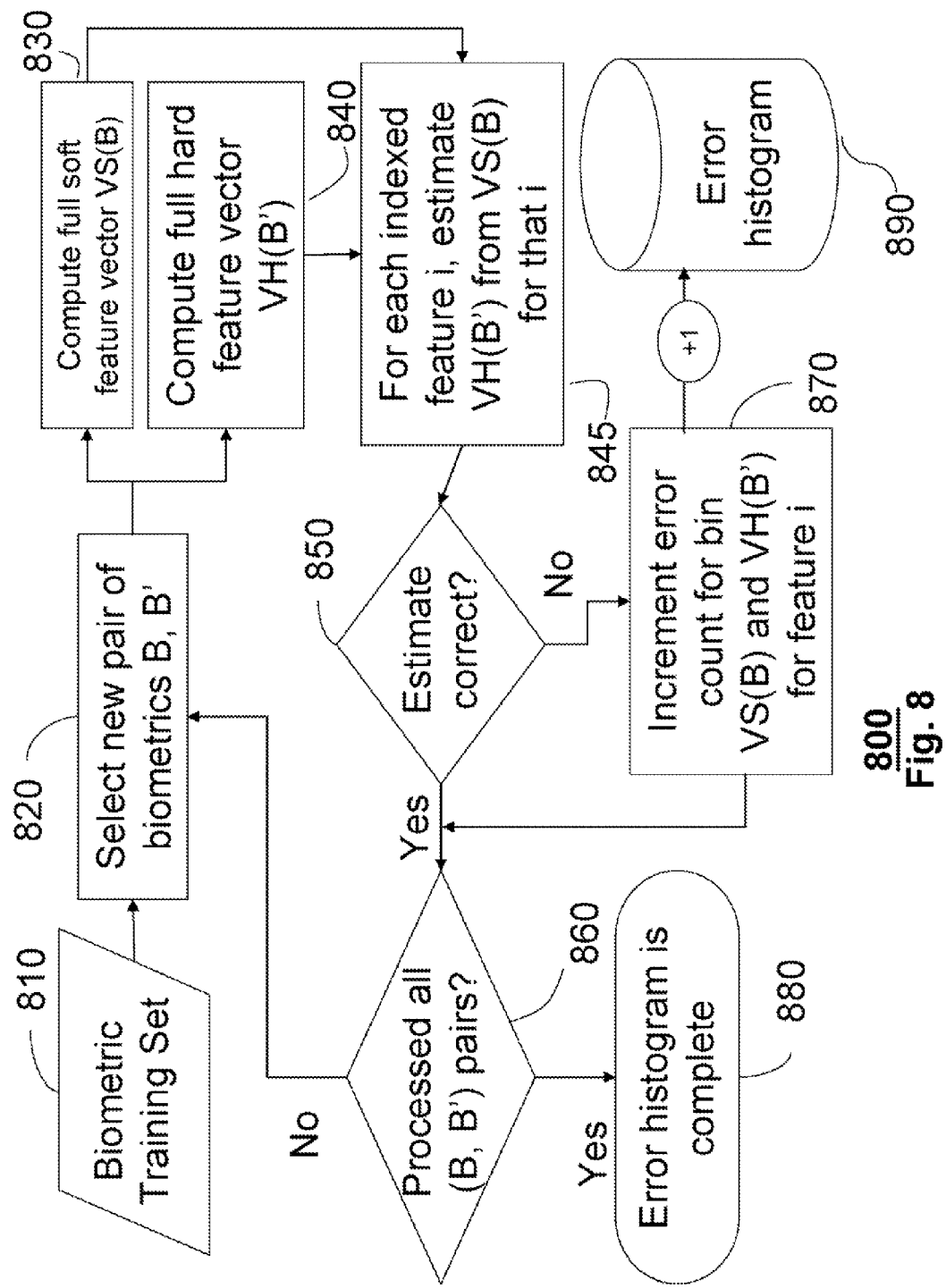
FIG. 8 is a block diagram of a process for generating a histogram according to an embodiment of the invention.

FIG. 8 shows a process 800 for generating an error histogram 890. First, we acquire 810 the training biometric data for a particular user taken on different occasions. Next, we select 820 a pair of biometric parameters B and B', and determine a full 'soft' feature vector VS(B) 830 and the full 'hard' feature vector VH(B') 840, Then, for each feature or dimension i in the full feature vector, we estimate 845 the value of VH(B') at the corresponding feature i from VS(B) at position i, and determine 850 if the estimate is correct. If the estimate is incorrect, then we increment 870 a bin for the corresponding values of VH(B') and VS(B) at feature i in the error histogram 890. After completing this process for each feature i, we check 860 if all pairs of biometrics B and B' have been processed. If not, we return to step 820 and select another pair of biometric parameters. If all pairs have already been processed, then the error histogram is complete and the process terminates 880.

Selecting a Syndrome Feature Vector

FIG. 9 shows a process 900 for selecting a syndrome feature vector with the aid of the error histogram of FIG. 8. First, the error histogram is sorted 910 from most reliable to least reliable features 920. Specifically, if E(i) is an average error predicting feature i of VH(B') from feature i of VS(B), then feature i is considered more reliable than feature j when E(i)<E(j). After the error histogram is sorted, we include 930 the next most reliable feature from the error histogram in the syndrome feature vector, and construct 940 the best syndrome code for the current syndrome feature vector, and test 950 whether including the most recent feature increases security or error resiliency. If security or error resiliency is increased, then we continue adding, additional features to the syndrome feature vector. Otherwise, we remove 960 the most recently added feature from the feature vector and we terminate 970 the process.

If it is desired to specify the level of security and optimize error resilience, then the following steps can be used for steps 940 and 950. First, in step 940, a new syndrome code with length N corresponding to the number of features currently in the feature vector is constructed by generating a low density parity check (LDPC) code with k syndromes from a fixed degree distribution. In this case, the level of security is held constant by fixing the quantity N−k, and keeping it constant throughout the process. Then a random biometric sample of biometric data is selected from the database, mapped to a syndrome vector by applying the parity check matrix of the LDPC code, and the resulting syndrome vector is decoded using belief propagation applied to another random biometric sample from the same user. Repeating this many times, yields an estimate of the error resilience of the syndrome code for the given feature vector. Alternatively, if more computationally complexity is tolerable in the design process, then a density evolution process can be used to optimize the degree distribution for the code, as well as to estimate the error probability more accurately, see T. J Richardson, M. A. Shokrollahi, and R. L. Urbankediscussed, "Design of capacity-approaching irregular low-density parity-check codes," IEEE Transactions on Information Theory, Volume 47, Issue 2, pp. 619-637, February, 2001, incorporated herein by reference.

If it is desired to specify the level of error resiliency and obtain the best security, the following steps can, be used for steps 940 and 950. First, in step 940 a new syndrome code with length N corresponding to the number of features currently in the feature vector is designed using the density evolution. Specifically, a sequence of different rate codes are constructed using the density evolution, until the highest rate code is found that meets the specified level of error resiliency as evaluated by the density evolution.

We refer to the feature vector selected by this process as the "syndrome feature vector" because it is a feature vector designed specifically for the syndrome code. We note that this feature vector can have different properties than other types of feature vectors constructed for biometric recognition, such as face or object recognition.

Measuring Inter-Coefficient Correlation

After the syndrome feature vector has been selected, the next step is to measure the inter-coefficient correlation if the data is believed to be correlated. This information cannot be extracted from the error histogram generated according to FIG. 7 because that error histogram was generated for the full feature vector 1202, while step 900 selects only a subset of the features in the full feature vector to produce the syndrome feature vector 1203.

FIG. 10 shows a process 1000 for measuring a first-order correlation in a binary syndrome feature vector. This process can also be applied to non-binary feature vectors or higher order correlations. First, an element from the biometric training data set is selected and a syndrome feature vector is extracted from the elements. Then, a counter variable i is initialized 1010 to zero. Next, we test 1020 if feature i is 0 or 1 and proceed to step 1030 in the former case and step 1040 in the latter. Then, we test 1030 if feature i−1, i.e., the previous feature, was 0 or 1, and increment 1035 the appropriate bin in the histogram. Intuitively, bin p00 counts the occurrences of a 0 followed by a 0, and bin p01 counts the occurrences of a 0 followed by a 1 and so forth. Next, we increment 1050 the counter i, and test 1060 if more features remain in the syndrome feature vector, and we repeat the process for the next feature. Otherwise, if we have already processed each feature then we terminate 1070 the process.

After the process in FIG. 10 is performed for each element in the biometric training set, we divide the values of the bins p00, p01, p10, and p11 by the size of the biometric training set to measure the first order correlation of the syndrome feature vector.

Using Density Evolution to Construct an Optimal Syndrome Code

After the syndrome feature vector 1203 has been selected and the inter-coefficient correlation has been measured, we then design the syndrome code 1204 using density evolution. Specifically, for all LDPC syndrome code, we design the degree distribution for the syndrome code.

To actually construct the optimal degree distribution, we apply the density evolution technique to produce several candidate degree distributions.

However, conventional density evolution processes as known in the art do not take into account inter-coefficient correlation. Therefore, while the candidate degree distributions produced by the density evolution may be adequate for the case of no inter-coefficient correlation, they will generally perform differently when inter-coefficient correlation is present.

In order to obtain the best degree distribution for the syndrome code, we compare the candidate degree distributions obtained by the density evolution on the biometric training data set, and select the degree distribution that at performs best. In alternative embodiments, we modify the conventional density evolution algorithm to take into account the inter-coefficient correlation.

Constructing a Belief Propagation Decoder for the Syndrome Code

The final step in designing a syndrome code is to construct the associated belief propagation syndrome decoder 1205.

FIG. 11A shows the high level structure of the enrollment phase, where using the syndrome code 1102 an encoder 330 produces a syndrome vector 1204 from the syndrome feature vector 1203.

FIG. 11B shows the structure for the complementary decoder 1107 used during the authentication phase. Again, noisy observations of the biometric data 1104 are acquired of a user attempting to authenticate. The biometric data 1104, together with its measurement model 1305, (and the measurement model parameters 1303), are used together with the syndrome vector 1204 and the feature model 1304 (and the parameters 1302 of that feature model) in an iterative belief propagation network (factor graph) to decode 1107 and produce an estimate 1108 of the original syndrome feature vector 1203. If the decoding is successful, then the estimated syndrome feature vector 1108 and the original syndrome feature vector 1203 match.

As shown in FIG. 11C, our construction 1100 of the belief propagation factor graph includes correlation nodes (C) 1130 that specifies the feature model 1304 (and the model parameters 1302), in addition to the check nodes (+) 1110 that specify the syndrome code 1102, and variable nodes (=) 1120. Specifically, the correlation node is added between each pair of consecutive variable nodes. The method for passing a message from the variable node to adjacent check nodes is modified to include an additional message from each adjacent correlation factor node that is multiplied with the other messages.

Specifically, using the notation of Kschischang et al., if $\mu_{y \to f}(x)$ is the incoming message for state x to variable node y from check $f$, and $L(x)$ is the incoming message from the correlation node on the left, then the outgoing message from the variable node to the correlation node on the right is $$L(x) \cdot \Pi \mu_{y \to f}(x),$$

while the outgoing message to the correlation node on the left is $$R(x) \cdot \Pi \mu_{y \to f}(x),$$

where $R(x)$ is the incoming from the correlation node on the right.

We also describe a method for passing a message to and from the correlation nodes according to an embodiment of our invention. Specifically, we describe the procedure for determining the messages $L(x)$ and $R(x)$. If $\mu(0)$ is the incoming message to a correlation node on the left, then the outgoing message on the right side of the correlation node, which is the incoming message to the variable node to the right of the correlation node, is $$L(0) = p00 \cdot \mu(0) + p10 \cdot \mu(1) \text{ and } L(1) = p10 \cdot \mu(0) + p11 \cdot \mu(1),$$

where the p00, p01, p10, and p11 terms are the first order correlation values measured as shown in FIG. 10.

Similarly, the outgoing message on the left side of the correlation node, which is the incoming message to the variable node on the left of the correlation node, is $$R(0) = p00 \cdot \mu(0) + p01 \cdot \mu(1) \text{ and } R(1) = p01 \cdot \mu(0) + p11 \cdot \mu(1).$$

Syndrome Code Design for Iris Biometric Parameters

Next, we describe the application of the procedure 700 to the specific case of iris biometric parameters. We select the full 'hard' feature vector to be the sequence of bits extracted from a set of Gabor filters as described in "How iris recognition works," by J. Daugman in IEEE Transactions on Circuits and Systems for Video Technology, Volume 14, Issue 1. January 2004 pages 21-30, incorporated herein by reference.

While the full 'hard' feature vector is binary, we select the full 'soft' feature vector to be quaternary. Specifically, we select the value of the full 'soft' feature vector of feature i to be the best guess of what that feature should be in the 'hard' feature vector, and we further append a bit indicating a reliability level. Specifically, we appended a bit indicating whether we were confident or not-confident in the decision for that feature.

For example, some features of the 'hard' feature vector may be difficult to predict, e.g., because the features are covered by the eyelid or eyelashes, and these features should receive the "not-confident" reliability value.

Next, we use the biometric training data to generate the error histogram as described above for FIG. 8, and then apply the feature vector design method of FIG. 9. While the full feature vector has a length of about 10,000, we discovered that many features 1202 are not reliable. For example, the components of the feature vector corresponding to the top of the eye are often covered by the eyelid or eyelashes. After the least reliable features are discarded by the procedure of FIG. 9, we are left with the roughly 2,000 most reliable features in the syndrome feature vector.

If we stop at step 900 in FIG. 7, the resulting syndrome vector will not be error resilient to tolerate the natural variation in iris biometric parameters for a single user. Specifically, the syndrome vector encoded from a measurement of a user's iris taken on one day combined with a measurement from the same iris taken on a different day fails to decode about 12% of the time. This justifies the need for the remaining steps in FIG. 7.

After we measured the first-order correlation using the procedure in FIG. 10, we detect that a bit the 'hard' syndrome feature vector was about twice as likely to take the same value as an adjacent bit as it was to take be opposite value of the adjacent bit. We then continued with step 740 in FIG. 7 to construct optimized syndrome codes using density evolution to exploit the high correlation. Finally, we followed step 1100 to construct a belief propagation decoder to take into accounts the high first-order correlation.

Following these steps yields syndrome codes that were more than an order of magnitude more reliable than our initial codes, thus demonstrating the advantage of following the entire procedure in FIG. 7.

Syndrome Code for Fingerprint Features

We apply the procedure 1300 to fingerprints. Fingerprint based systems are generally either pattern-based or minutiae-based. We use the later. We extract a feature vector from fingerprint minutiae. While the general procedure 1300 can be applied to most biometric data, we describe the details of the procedure for minutiae of a fingerprint. As a characteristic, fingerprint minutiae can vary, over time, and the measuring process is subject to structured noise.

Figure 14:
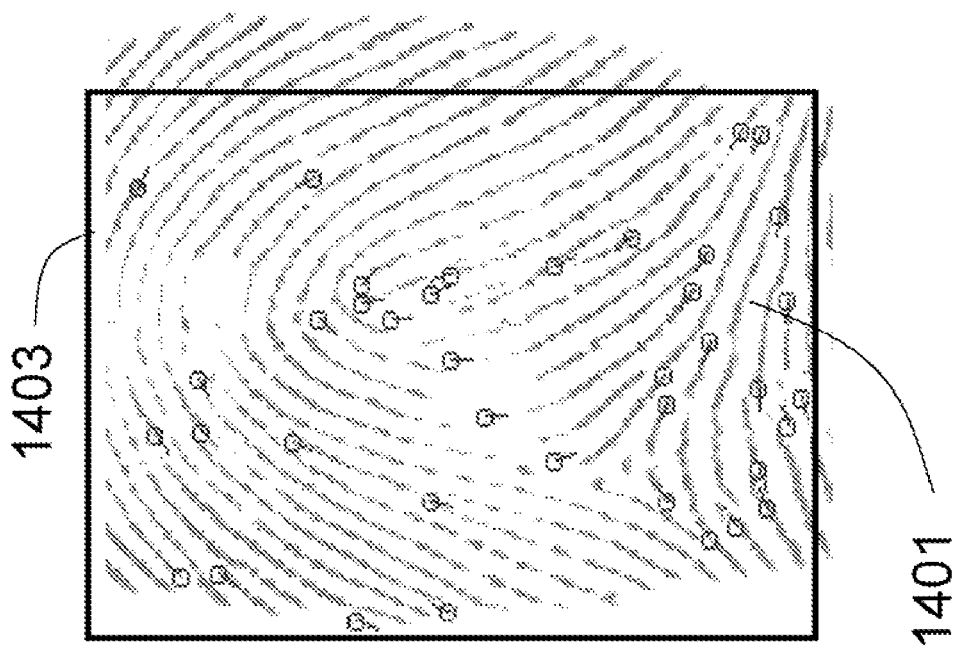
FIG. 14 is a block diagram of fingerprint minutiae encoding according to an embodiment of the inventions.

FIG. 14 shows an example fingerprint 1401 and extracted feature vector 1402. The extracted feature vector 1402 is an example of a syndrome feature vector 1203. The features are only measured in a measurement field (observation window) 1403. For convenience, the minutiae are indicated by the squares in a grid. Each minutia is mapped to a triplet, e.g., (a, b, c) representing spatial position coordinates (a, b) and an angle (c) of the minutia. As describe below, one minutia can be designated as the "core" for the purpose of alignment.

Because a plane in which the finger-print 1401 is measured is quantized by a digital sensor with an array of pixels, we store the feature as a matrix. Each sensor pixel corresponds to a particular entry in the matrix 1402. The presence of a minutia is indicated by a '1', while the lack of a sensed minutia is represented by a '0' in the matrix 1402. In a more general representation, instead of a '1' to signify the presence of a minutia, the entries in the matrix would be the angle c of the minutia.

The number, position and angle of the minutiae change from one measurement of a fingerprint to the next. For example, if a minutia at (74, 52, 36°) is present in one measurement, it may appear as (80, 45, 63°) in another measurement, or not at all.

For a variety of reasons, this variability of the minutiae from one measurement to the next causes problems for many conventional methods for processing fingerprints.

Explicit Biometric Data Variability

As shown, in FIGS. 15A-15C, our model can deal with the variability in biometric data. In these Figures, the dashed lines 1500 indicate a local neighborhood. FIG. 15A shows movement $(p_{i,j})$ 1501 of a minutia. FIG. 15B shows deletion $p_e$ 1502, and FIG. 15C shows insertion $p_s$.

Figure 16A:
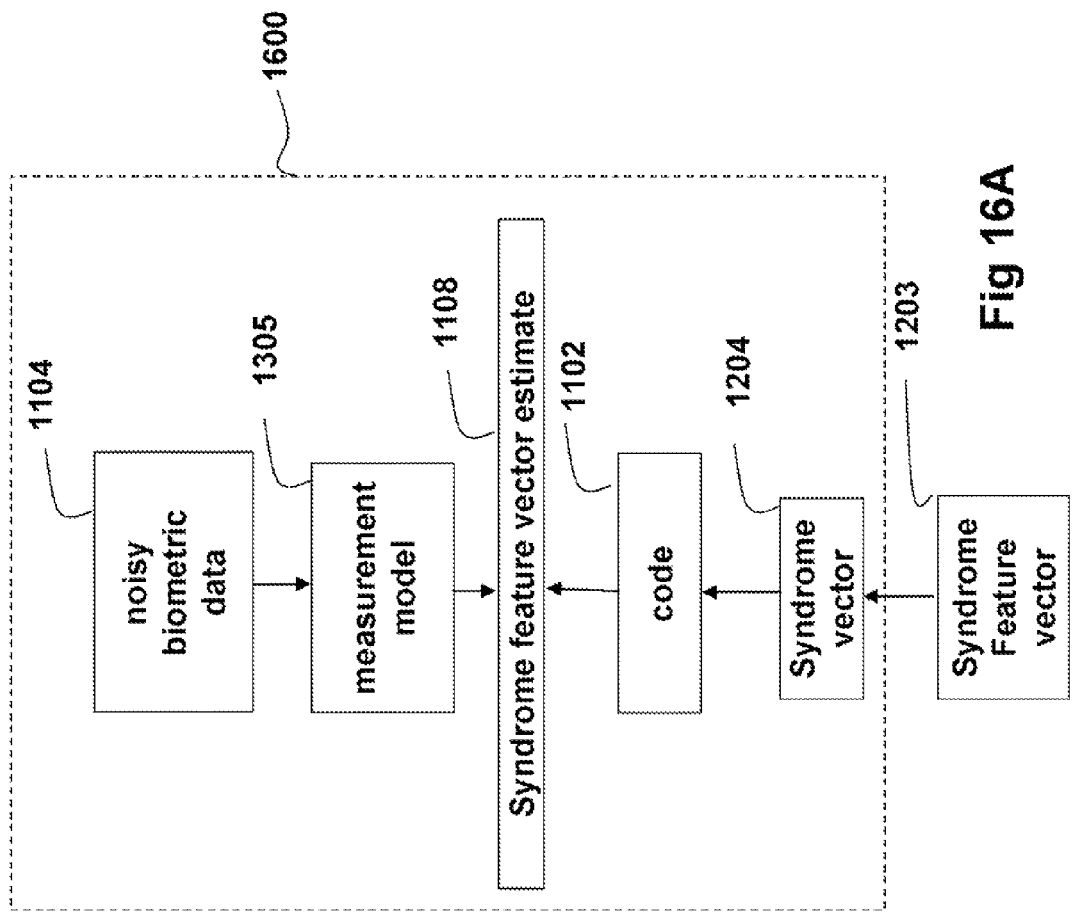
FIG. 16A and FIG. 16B are respectively block diagrams of high and low level details of a belief propagation factor graph according to an embodiment of the invention.
Figure 16B:
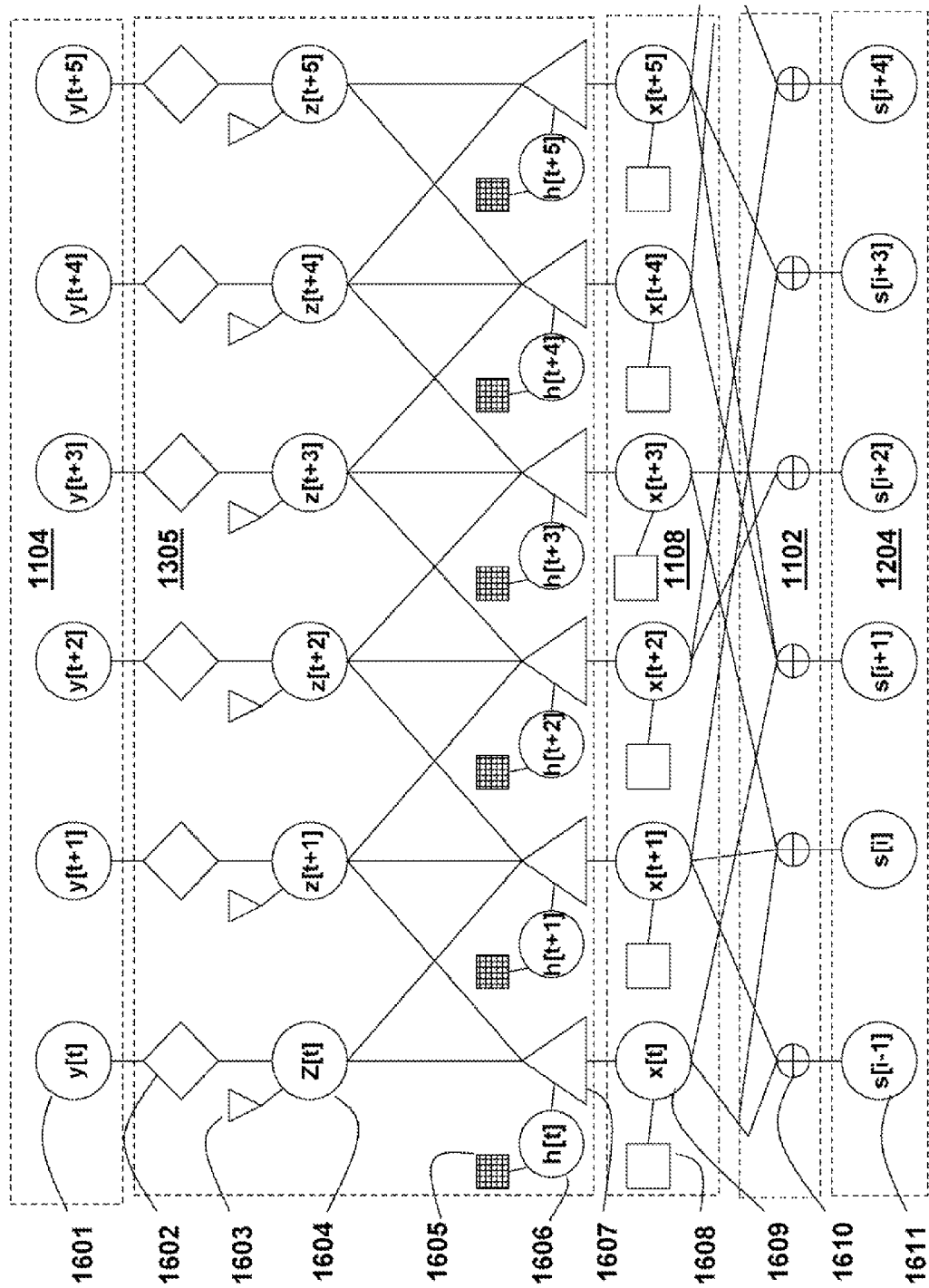

FIGS. 16A and 16B show respectively high-level and low-level details of a factor graph 1600 used to implement belief propagation decoding 1107 according to an embodiment of our embodiment.

At a high level the biometric data 1201 is used to generate the syndrome feature vector 1203 which is used to produce the syndrome vector 1204. The syndrome feature vector 1203 not known by the decoder, but the syndrome vector 1204 is. The syndrome vector 1204 and syndrome feature vector 1203 are related by a code structure 1623. The decoder also obtains a noisy measurement of biometric data 1104. The noise structure is described by a statistical model 1305. Together the syndrome vector 1203, the code structure 1623, the observation 1104, and the measurement model 1305, are used to decode 1107 and produce in estimate 1108 of the original syndrome feature vector 1203.

FIG. 16B show the low-level structure of the factor graph 1600 that describe the statistical model of the syndrome feature vector, the syndrome vector, and the noisy observations.

Each position t the feature vector grid 1402 has a corresponding binary random variable x[T] node 1609 in the factor graph 1600. This random variable is one minutia is present at position t during enrollment and zero otherwise.

The association of grid positions and labels t of the feature vector can be arbitrary, e.g., in a raster-scan order. The two-dimensional nature of the feature set is taken into account in our model.

For each grid position, there is a prior probability that a minutia is present during enrollment. This prior probability, Pr[x[t]=1], is denoted by factor node 1608.

For each position of the variable nodes 1609 for the enrollment grid there is a corresponding authentication position node 1601 for the corresponding authentication grid. The presence of a minutia at grid position t during authentication is represented by a binary random variable y[t]. This variable equals one if a minutia is present in the probe, and zero otherwise. The goal of the factor graph is to represent the joint distribution of a first measurement of the fingerprint during enrollment and a second measurement during authentication.

In our model, each enrollment position, where x[t]=1, has a probability that the minutia at position t moves to position in a neighborhood of position t in the probe, or is not measured, in the case of a deletion.

The variables 1604 represent the relative change in position of an enrollments minutia, while the factor nodes 1603 represent the prior probability distribution on the movement and the probability of inserted minutiae. In particular, for the one-dimensional movement model shown in FIG. 16B, z[t]=i indicates that a minutia at position x[t+i] during enrollment moved to position z[t] during authentication. More generally, and in our implementation, we use a two-dimensional movement model.

A domain or neighborhood of such shifts {i} is a design parameters indicated by the dashed lines 1500. If the variable z[t]=s, then a spurious minutia is inserted during authentication at position t, and z[t]=* indicates there is no minutiae at position t during authentication. There is an exact correspondence between the variables a[t] such that a[t]=*, and those y[t] such that y[T]=0.

To represent the constraint that an enrollment minutiae at position t, i.e., x[t]=1, can explain at most one observed minutia in the neighborhood of t, we include the factor nodes 1607. The random variable h[t] 1606 connected to these nodes are binary variables representing deletions of x[t]. Deletions can result from non-sensed or non-extracted minutiae, or a false minutiae sensed during enrollment, or from large movement. The nodes 1605 represent the prior distribution for each h[t].

The factor nodes 1602 connecting each node y[t] to its corresponding node z[t] express the notion that each authentication minutiae y[t] should only be non-zero if the corresponding node z[t] is not *.

To this model, we add the constraints resulting from the syndrome code 1102. Each syndrome node s[j] 1611 satisfies a local code constraint 1610 which is an indicator function equal to one if the value of the syndrome is compatible with the feature vector x[1], x[2], . . . , and zero otherwise.

The orientations of the minutiae can be added to the factor graph. To add the orientation information, the enrollment nodes 1609 indicate both the position t and the orientation the minutia. This information is also reflected in the prior probability node 1608. We quantize the orientation during enrollment to make the orientation compatible with the hard feature vector necessary for syndrome encoding.

The vector of syndrome bits 1611 are encoded as before, but now from the vector of enrollment variables 1609 indicating the presence or absence of a minutiae, and its orientation, if present. The prior probabilities of deletions 1605 remain unchanged, as do the constraints 1607 on movement. The prior probabilities on movement and insertions 1604 remain unchanged. The constraint nodes on the authentication nodes 1602 are changed to reflect the notion that smaller changes in orientation between enrollment nodes 1609 and authentication nodes 1601 are likely.

Message Passing Rules and Optimizations

Given the measurement and movement model as represented by the factor graph 1600, message passing rules can be derived using conventional techniques. In the following, we describe several simplifications of message passing to achieve a reduced complexity.

A first simplification relates to messages from the constraint nodes 1602. We "prune" the factor graph to remove unobserved minutiae. Specifically, according to the form of the constraint 1602, if y[t]=0, then the only non-zero message from node 1602 to the z[t] variable node 1604 is for the state z[t]=*.

Consequently, the only non-zero message z[t] that is sent to the neighboring nodes 1607 is for the * state. We can assume this constant message is normalized to one. For example, if y[t]=y[t+2]=y[t+4]=y[t+5]=*, then instead of using the full factor graph of FIG. 16B, we instead use a pruned graph 1700 as shown in FIG. 17 to derive the necessary message passing operations. This leads to a large reduction in the complexity of calculating messages for the nodes 1607.

We obtain a second simplification by computing messages going into or out of the factor nodes 1607. We do not need to use the full messages from the z[t] variable nodes. Instead we can reduce these messages to binary messages indicating whether the minutia at x[t'] moves to a position corresponding to position z[t]. By using binary information for the node z[t], we obtain significant computational savings.

We obtain a third simplification for various rules by first computing a set intermediate quantities and reusing these intermediate quantities later. For example, the outgoing message from a variable node z[t] is the product of incoming messages from all other nodes. If there are K connections to a variable node z[t], the straightforward implementation of this rule requires computation proportional to $K^2$, because for each connecting edge, one should combine messages from the other K−1 connections. To do this more efficiently, we combine all the messages coming into the node z[t] once, in the process computing the marginal belief for the node z[t]. Then, to obtain the outgoing message for a particular connection, we divide or subtract in the log-likelihood domain, the total message by the incoming message from that connection.

A similar re-use of intermediate quantities can also be applied in computing the outgoing messages from the triangle nodes. In particular let z'[t] represent the binary message from variable node z[t] to node 1607 at position t'. The quantity z'[t] indicates whether the minutia moves from position t' to position t during authentication. The straightforward sum-product rule for the nodes 1607 on these binary messages requires summing over all possible combinations of the variable nodes 1604 connected to the node 1607 at position t'. For example, if node 1607 at position t' is connected to nodes z[1], z[2], z[3], and z[4], then computing the message to z'[1], requires summing over all possible combinations of z'[2], z'[3], and z'[4]. This method has a computational complexity that is exponential in the number of variable nodes connected to each triangle node.

We can eliminate this exponential complexity by realizing that the constraints node 1607 allows at most one of the z'[t] nodes to be non-zero. Thus, each out-going message for node z'[t] contains a term corresponding to all other nodes z'[t] being zero, as well as a term corresponding to all the other nodes z'[t], except one node being zero. By pre-computing these terms, the message passing rules for the factor nodes 1607 can be reduced from exponential complexity, in the number of connections to a linear complexity in the number of connections.

Gathering Statistics

Figure 18:
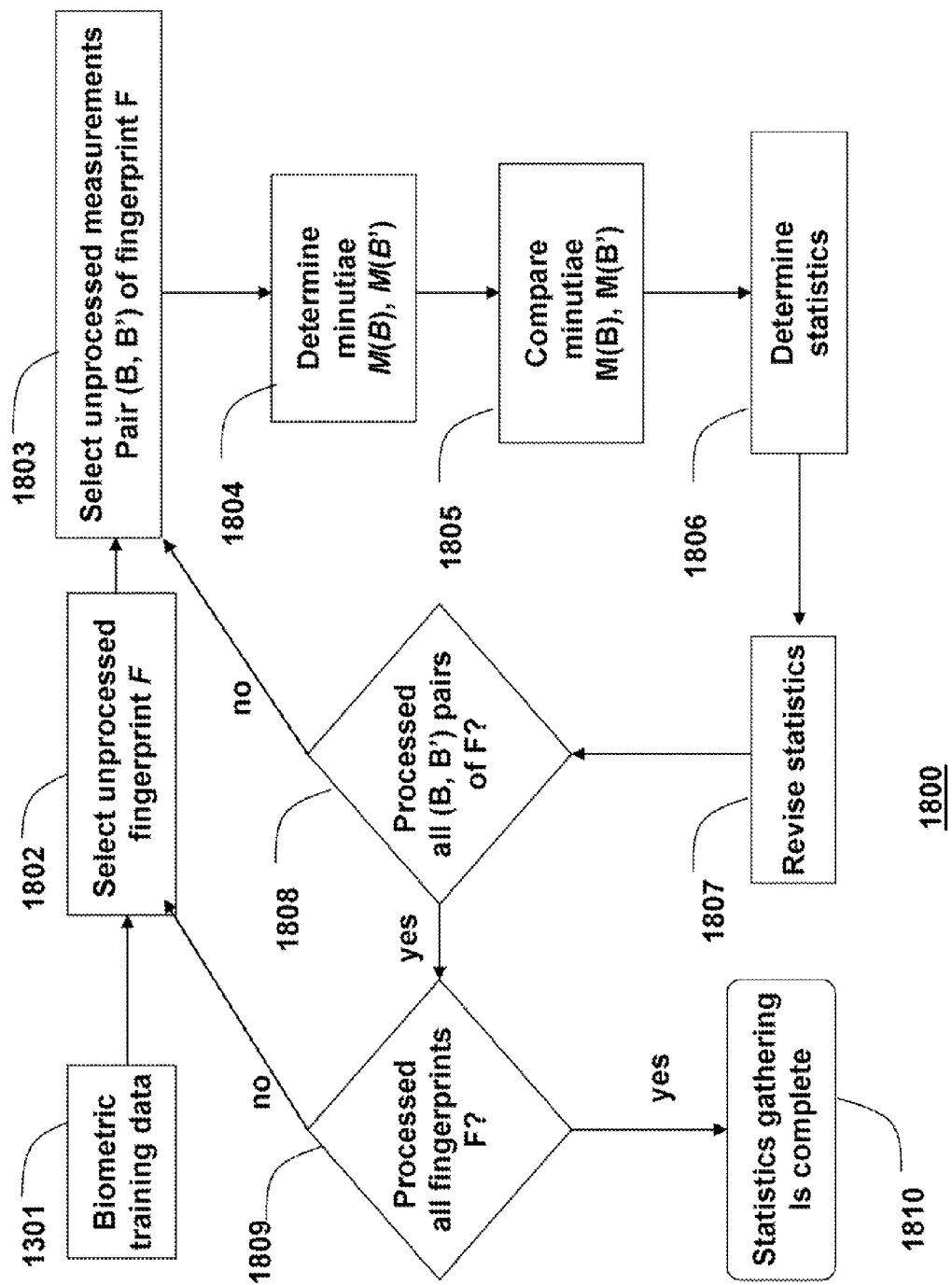
FIG. 18 is a block diagram of a process for estimating parameters of the movement and measurement model of fingerprint minutiae according to an embodiment of the invention.

FIG. 18 shows a process 1800 for setting the parameters 1303 of the factor graph 1600, i.e., the model according to the invention. Biometric training data 1301 are acquired. An unprocessed fingerprint F is selected 1802. An unprocessed pair of measurements B and B' of the fingerprint F are selected 1803. We determine 1804 their respective minutiae M(B) and M(B'). We compare 1805 the minutiae 1806, and determine 1806 statistics of movements, rotations, insertions and deletions. The statistics are used to revise 1807 the statistics in the factor graph. If there is a pair of measurements of the fingerprint F not yet processed 1808, we return to step 1803. Else, if there is a fingerprint not yet processed 1809, we return to step 1802. After all the fingerprints and their pairs are processed, the statistics gathering is complete in step 1810.

Data Alignment

In biometric systems, the enrollment biometric data are often misaligned with the authentication data. Different measurements of the same biometric data often vary by global transformations such as translation, rotation, and scaling. Such variations pose less of a problem for pattern-based biometric authentication or authentication schemes which do not use syndrome coding.

In contrast, in our system, only the syndrome vector 331 of the enrollment biometric parameters are available for comparison. Therefore, a search over different alignments entails a decoding for each possible alignment, but to minimize the computational expense of decoding, we want to minimize the search space.

FIG. 19 shows the steps of an alignment process for fingerprints during enrollment or authentication according to an embodiment of our invention. A fingerprint is acquired 1901, and minutiae parameters are extracted 1902 as well as the core point location and orientation. The core point and its orientation defines an inertial reference frame for the fingerprint, where the position of the core point is an origin and the orientation serves as a y-axis. We recalculate 1903 the position and orientation of the minutiae with respect to the inertial reference frame associated with the core point. The result 1904 is a set of minutiae measured in a reference frame for the fingerprint.

As art advantage, this procedure can remove most or all of the effects of translations and rotations. Typically such pre-processing is combined with a computationally more intensive local search where decoding is performed at a smaller set of translations and rotations. This pre-processing procedure can be used as part of the minutiae extraction routines.

Post-Alignment Revision of Parameter Settings

Whenever the enrollment and authentication biometric features are shifted with respect to each other before decoding, the parameters of the factor graph are modified to reflect this shifting. An example of this is when the enrollment and authentication features are shifted with respect to each other, either due to the alignment procedure 1900, or due to a number of small shifts corresponding to a local search.

Depending on the shift, and the relative sizes of the enrollment and authentication observation windows 1403, see FIG. 14, some enrollment feature locations may not be observed at all during authentication. Therefore, we modify the factor graph to reflect this by setting the probability of minutiae erasure to one for these non-observed positions. This is reflected in FIG. 16B by setting the erasure probability in factor node 1605 equal to one. For minutiae near the edge of the window 1403, which have some likelihood of being observed, and some of not being observed, the prior probabilities 1605 are modified accordingly.

Effect of the Invention

The invention achieves secure user authentication based on biometric parameters. The invention is secure because syndrome vectors are stored instead of the original biometric data or any feature vectors. This prevents an adversary who gains access to the database from learning the underlying biometric data.

It is possible to bound a best possible estimate of all original biometric parameters E, which an adversary can make using only the syndrome vector S, using conventional tools from the well known problem of multiple descriptions, e.g., see V. K. Goyal, "Multiple description coding: compression meets the network," IEEE Signal Processing Magazine, Volume: 18, pages 74-93, September 2001. Furthermore, it is possible to develop these bounds whether a quality of estimate is measured via absolute error, squared error, weighted error measures, or any arbitrary error function. In contrast, all prior art methods are based on binary values. There, security depends on the Hamming distance.

Essentially, the security of the syndrome vector S is due to the fact that it is a compressed version of the original biometric parameter E. Furthermore, this compressed representation corresponds to the "least significant bits" of E. Using well known tools from data compression theory, it is possible to prove that if a syndrome code with a high compression is used, then these least significant bits can at best yield a poor estimate of the original parameters E, for example, see Effros "Distortion-rate bounds for fixed- and variable-rate multi-resolution source codes," IEEE Transactions on Information Theory, volume 45, pages 1887-1910, September 1999, and Steinberg and Merhav, "On successive refinement for the Wyner-Ziv problem," IEEE Transactions on information Theory, volume 50, pages 1636-1654, August 2004.

Second, the invention is secure because forgery is at least as difficult as finding a collision in the underlying hash function 340. In particular, the system only accepts a syndrome pair (S, H) in the authentication phase 390 if the hash H' of the decoded biometric E" matches the original hash H. For cryptographic hash functions, such as MD5, finding an element E", which differs from E, but has a hash that matches the hash of E is generally considered impossible. Thus, if syndrome decoding succeeds in decoding E' with the proper hash, the system can be confident that E" is in fact the same as E, and all authentication decisions are made with the original biometric parameters.

Third, the invention compresses the original biometric parameters E in producing the syndrome vector S. Biometric databases for many users can require large amounts of storage, especially if the biometric data question requires large amounts of data, e.g., face images or speech signals. Therefore decreasing the storage required can yield drastic improvements in both cost and error resiliency. In contrast, most prior art methods for the secure storage of biometric data actually increase size of the stored data due to the overhead of encryption or error correction, and therefore require more storage than insecure systems.

Fourth, the invention can apply sophisticated code construction and decoding algorithms because the invention is built on the theory of syndrome codes. In particular, the syndrome coding according to the invention facilitates the use of soft decoding using the well known Viterbi algorithm, belief propagation, and turbo decoding for both binary and multilevel code constructions. In contrast, because most prior art in methods are based on binary codes, Reed-Solomon codes, and algebraic decoding, soft decoding cannot be applied effectively when the biometric data take on real values, as opposed to binary values. For example, some methods specifically require compiling the XOR of the biometric data with a random codeword in the enrollment phase to produce the reference and requires computing the XOR of the reference with the biometric data in the authentication phase.

Fifth while most prior art can secure biometrics using error connection encoding, the invention uses syndrome encoding. The computation complexity of error correction encoding is usually super linear in the input size. In contrast, by using various types of low density parity checks based syndrome codes, it is easy to construct syndrome encoders where the computational complexity of the syndrome encoding is only linear in the input size.

Sixth, by using the syndrome coding framework, it is possible to use powerful new embedded syndrome codes as the SCA codes described by Yedidia et al in U.S. patent application Ser. No. 10/928,448, "Compressing Signals Using Serially-Concatenated Accumulate Codes," incorporated herein by reference. These codes allow the syndrome encoder, during enrollment, to estimate an inherent variability of biometric data, and encode just enough syndrome bits to all successful syndrome decoding.

Seventh, the syndrome codes as describe above can be used to encrypt data. Furthermore, methods are described to enable the design for an optimal syndrome code with a given level of performance and error resiliency.

Eighth, the syndrome feature vector can be correctly decoded even if the measurement channel is subject to structured noise.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method securely storing biometric parameters in a database, comprising:
    encoding enrollment biometric parameters of a user using a syndrome encoder to produce an enrollment syndrome vector, wherein the enrollment syndrome vector is quantized;
    applying a hash function to the enrollment biometric parameters to produce an enrollment hash;
    storing the enrollment syndrome vector and the enrollment hash in a database;
    decoding the enrollment syndrome vector using a syndrome decoder and authentication biometric parameters to produce decoded biometric parameters, wherein the authentication biometric parameters are unquantized;
    applying the hash function to the decoded biometric parameters to produce an authentication hash; and
    comparing the authentication hash and the enrollment hash to determine a similarity between the enrollment biometric parameters and the authentication biometric parameters.

2. The method of claim 1, further comprising:
    acquiring enrollment biometric data from a user; and
    extracting the enrollment biometric parameters from the enrollment biometric data.

3. The method of claim 2, further comprising:
    aligning the enrollment biometric data based on a coordinate system intrinsic to the enrollment biometric data.

4. The method of claim 2, in which the enrollment biometric data are acquired of a face.

5. The method of claim 2, in which the enrollment biometric data are acquired of speech.

6. The method of claim 2, in which the enrollment biometric data are acquired of a fingerprint.

7. The method of claim 2, in which the enrollment biometric data includes minutiae of a fingerprint.

8. The method of claim 7, in which the enrollment biometric parameters indicate positions of the minutiae.

9. The method of claim 8, in which the enrollment biometric parameters indicate orientations of the minutiae.

10. The method of claim 3, in which the aligning is according to a coordinate system associated with a fingerprint core point.

11. The method of claim 1, further comprising:
acquiring authentication biometric data from a user; and
extracting the authentication biometric parameters from the authentication biometric data.

12. The method of claim 1, in which the syndrome decoder uses belief propagation.

13. The method of claim 1, in which the syndrome decoder is based on a measurement model that accounts for structured noise in a process for acquiring the biometric data.

14. The method of claim 1, in which a design of the syndrome encoder further comprises the steps of:
determining parameters of a source model and a channel model from training data; and
constructing the syndrome encoder according to the parameters and the source model and the channel model.

15. The method of claim 14, in which the channel model includes structured noise.

16. The method of claim 2, further comprising:
generating an error histogram from the biometric data; and
sorting the error histogram from most reliable to least reliable features; and
selecting the most reliable features as the enrollment biometric parameters.

17. The method of claim 16, further comprising:
measuring a first-order inter-coefficient correlation of the biometric parameters; and
applying a density evolution to the first-order inter-coefficient correlation to design a syndrome code for the syndrome encoder.

* * * * *